US012724783B2

(12) United States Patent
Fairchild et al.

(10) Patent No.: US 12,724,783 B2
(45) Date of Patent: Sep. 1, 2026

(54) ARTIFICIAL INTELLIGENCE ARCHITECTURE FOR IDENTIFYING RELATIONSHIPS BETWEEN DATA OBJECTS OF DIFFERENT TYPES WITHIN A CONSTRUCTION MANAGEMENT SOFTWARE APPLICATION

(71) Applicant: Procore Technologies, Inc., Carpinteria, CA (US)

(72) Inventors: Michael David Fairchild, Ventura, CA (US); Samuel Thomas Weston Butler, Austin, TX (US); Shelley Prakash Duggal, Austin, TX (US); Ramsay Stirling, II, Santa Barbara, CA (US); Matt Man, Thornhill (CA); Mark Alexander Tyrrell, Round Rock, TX (US)

(73) Assignee: Procore Technologies, Inc., Carpinteria, CA (US)

(*) Notice: Subject to any disclaimer, the term of this patent is extended or adjusted under 35 U.S.C. 154(b) by 0 days.

(21) Appl. No.: 18/952,924

(22) Filed: Nov. 19, 2024

(65) Prior Publication Data

US 2026/0140955 A1 May 21, 2026

(51) Int. Cl.
*G06F 16/2457* (2019.01)
*G06F 16/242* (2019.01)
*G06Q 10/10* (2023.01)

(52) U.S. Cl.
CPC ...... *G06F 16/24575* (2019.01); *G06F 16/243* (2019.01); *G06Q 10/103* (2013.01)

(58) Field of Classification Search
CPC ............ G06F 16/24575; G06F 16/243; G06Q 10/103
See application file for complete search history.

(56) References Cited

U.S. PATENT DOCUMENTS

2024/0403289 A1* 12/2024 Hawes ................ G06F 16/2455
2024/0428045 A1* 12/2024 Nguyen ................. G06N 3/006
2025/0045528 A1* 2/2025 Focke ..................... G06F 40/30

OTHER PUBLICATIONS

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

(Continued)

*Primary Examiner* — Charles Rones
*Assistant Examiner* — Xiaoqin Hu
(74) *Attorney, Agent, or Firm* — Lee Sullivan Shea & Smith LLP

(57) ABSTRACT

An example computing platform is configured to: (i) receive an incoming request to identify relationships between data objects within a construction management software application; (ii) identify an AI agent to handle the incoming request; (iii) generate, via the AI agent, a search query for identifying a candidate set of data objects related to a given data object; (iv) perform a search with the search query to identify the candidate set; (v) generate a prompt comprising a request to determine which of the candidate set are related to the given data object; (vi) pass the prompt to a generative AI model; (vii) receive, from the generative AI model, a prediction of which of the candidate set are related to the given data object; (viii) based on the prediction, determine a final set of data objects related to the given data object; and (ix) send a response identifying the final set.

20 Claims, 10 Drawing Sheets

(56) References Cited

OTHER PUBLICATIONS

"Building a Function Calling Agent With LM-Kit", Im-kit.com, [online], [retrieved Oct. 17, 2024], Retrieved from the Internet:<URL:https://Im-kit.com/blog/building-a-function-calling-agent-with-Im-kit, Oct. 16, 2024, 12 pages.

"Building AI Agents Using Function Calling With LLMs", FriendliAI Tech & Research, [online], [retrieved Oct. 17, 2024], Retrieved from the Internet:<URL:https://medium.com/friendliai/building-ai-agents-using-function-calling-with-llms-9d08c66ba107, Aug. 8, 2024, 20 pages.

Prasath, Selva, "Building AI Agents With RAG and Function Calling", Medium, [online], [retrieved Oct. 17, 2024], Retrieved from the Internet:<URL:https://medium.com/@SelvaPrasath/building-ai-agents-with-rag-and-function-calling-72d0b0a805cf, Jul. 9, 2024, 9 pages.

"Function Calling", OpenAI Platform, [online], [retrieved Oct. 17, 2024], Retrieved from the Internet:<URL:https://platform.openai.com/docs/guides/function-calling, 21 pages.

Qian, Chen et al., "ChatDev: Communicative Agents for Software Development", arXiv:2307.07924v5 [cs.SE], Jun. 5, 2024, 13 pages.

"Conceptual Guide", LangGraph, Concepts [online], [retrieved Jan. 14, 2025], Retrieved from the internet:<URL:https://langchain-ai.github.io/langgraph/concepts, 4 pages.

Park, Joon Sung et al., "Generative Agents: Interactive Simulacra of Human Behavior", arXiv:2304.03442v2 [cs.HC], Aug. 6, 2023, 22 pages.

"Build AI Agent Teams That Work Together to Tackle Complex Tasks", Introduction—CrewAI, [online], [retrieved Jan. 14, 2025), Retrieved from the internet:<URL:https://docs.crewai.com/introduction#how-crewai-works, 4 pages.

Yao, Shunyu et al., "ReAct: Synergizing Reasoning and Acting in Language Models", arXiv.2210.03629v3 [cs.CL], Published as a Conference Paper at ICLR, Mar. 10, 2023, 33 pages.

* cited by examiner

ARTIFICIAL INTELLIGENCE ARCHITECTURE FOR IDENTIFYING RELATIONSHIPS BETWEEN DATA OBJECTS OF DIFFERENT TYPES WITHIN A CONSTRUCTION MANAGEMENT SOFTWARE APPLICATION

BACKGROUND

Increasingly, parties involved in construction projects are beginning to use software applications to manage those construction projects. One example of such a software application is the software-as-a-service (Saas) application for construction management offered by Procore Technologies, Inc. ("Procore"), who is the current applicant. Using construction management software applications such as these, parties can create a digital representation of a given construction project that is to be managed and then create, store, view, and/or interact with various types of digital project data associated with the given construction project. Such digital project data may include specifications, drawings, photos, building information model (BIM) files, requests for information (RFIs), punch lists (e.g., which list work that has not yet been completed or has been completed incorrectly), risk management plans, safety plans, work breakdown structures, change orders, inspection documents (e.g., which record information about the results of inspections), construction submittals (e.g., information that a responsible contractor provides to a general contractor and/or submits to a design team for approval of equipment and/or materials)), construction site observation reports, project management records (e.g., project schedules, schedule items, and project budgets), third-party records (e.g., applicable zoning restrictions, real-estate title records and purchase records, records of public hearings pertinent to the given construction project), directories, invoices, timesheets, meeting minutes, sensor data, and daily logs (e.g., which record information about each day work is done at a work site of the construction project), among many other examples of project data that may be stored for a construction project.

SUMMARY

Disclosed herein is new software technology for generating construction-based data objects via a unified user interface that provides a user with input fields that correspond with each of a set of user-selectable types of construction-based data objects.

In one aspect, the disclosed technology may take the form of a method that involves (i) receiving, from a client device, an incoming request to identify relationships between data objects within a construction management software application; (ii) identifying, from among a plurality of artificial intelligence (AI) agents, a first AI agent that is to be utilized to handle the incoming request; (iii) generating, via the first AI agent, a search query that seeks to identify a candidate set of data objects of a first type that are related to a given data object of a second type; (iv) performing a search in accordance with the search query to identify the candidate set of data objects of the first type; (v) generating a prompt for a generative AI model that comprises a request to determine which of the candidate set of data objects of the first type are related to the given data object of the second type; (vi) passing the prompt to the generative AI model; (vii) receiving, from the generative AI model, a prediction of which of the candidate set of data objects of the first type are related to the given data object of the second type based on the prompt; (viii) based on the prediction, determining a final set of data objects of the first type that are related to the given data object of the second type; and (ix) sending, to the client device, a response to the incoming request comprising an identification of the final set of data objects.

In some examples, identifying the first AI agent that is to be utilized to handle the incoming request comprises (i) generating a second prompt for the generative AI model comprising a request to determine which of the plurality of AI agents is best suited to handle the incoming request; (ii) passing the second prompt to the generative AI model; (iii) receiving, from the generative AI model, a prediction of which of the plurality of AI agents is best suited to handle the incoming request; and (iv) using the prediction of which of the plurality of AI agents is best suited to handle the incoming request as a basis for identifying the first AI agent that is to be utilized to handle the incoming request.

Further, in some examples, identifying the first AI agent that is to be utilized to handle the incoming request comprises (ii) generating a set of feature data based on the incoming request; (ii) passing the set of feature data as input to a rule-based model; (iii) receive, from the rule-based model, a prediction of which one of the plurality of AI agents is best suited to handle the incoming request, and (iv) using the prediction of which of the plurality of AI agents is best suited to handle the incoming request as a basis for identifying the first AI agent that is to be utilized to handle the incoming request.

Still further, in some examples, generating, via the first search agent, the search query that seeks to identify the candidate set of data objects of the first type that are related to the given data object of the second type comprises (i) identifying, for each of one or more data fields defined for data objects of the second type, a respective value for the given data object of the second type; and (ii) including the respective values for the one or more data fields in the search query.

Still further, in some examples, generating, via the first search agent, the search query that seeks to identify the candidate set of data objects of the first type that are related to the given data object of the second type comprises (i) transforming the given data object of the second type into a set of one or more embeddings; and (ii) generating a search query that contains the set of one or more embeddings.

Still further, in some examples, the prompt for the generative AI model further comprises (i) an identification of the given data object of the second type and (ii) an identification of the candidate set of data objects of the first type.

Still further, in some examples, (i) the identification of the given data object of the second type comprises respective values for one or more data fields contained within the given data object of the second type and (ii) the identification of the candidate set of data objects of the first type comprises respective values for one or more data fields contained within data objects found in the candidate set of data objects of the first type.

Still further, in some examples, the first type of data object is a schedule item type and the second type of data object is a submittal type.

Still further, in some examples, the second type of data object is a photo type.

In another aspect, the disclosed technology may take the form of a computing system comprising at least one processor, at least one non-transitory computer-readable medium, and program instructions stored on the at least one non-transitory computer-readable medium that are executable by the at least one processor such that the computing platform is configured to carry out the functions of the aforementioned method.

In yet another aspect, the disclosed technology may take the form of a non-transitory computer-readable medium comprising program instructions stored thereon that are executable to cause a computing system to carry out the functions of the aforementioned method.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

The following disclosure refers to the accompanying figures and several examples. One of ordinary skill in the art would understand that such references are for the purpose of explanation only and are therefore not meant to be limiting. Part or all of the disclosed systems, devices, and methods may be rearranged, combined, added to, and/or removed in a variety of manners, each of which is contemplated herein.

As noted above, construction management today is often performed through the use of software applications, such as the software application for construction management provided by Procore Technologies, Inc.®, the applicant of the present disclosure. These construction management software applications generally provide users with the ability to create, store, view, and/or interact with various types of digital data related to a construction project. In practice, these construction management software applications may take various forms.

As one possible implementation, a construction management software application may include both front-end software (e.g., a web application, desktop application, or mobile application) running on client devices that are accessible to individuals associated with construction projects (e.g., contractors, project managers, architects, engineers, designers, etc.) and back-end software running on a back-end computing platform (sometimes referred to as a "cloud" platform) that interacts with and/or drives the front-end software, and which may be operated (either directly or indirectly) by the provider of the front-end software. This form of a software application may be referred to as a client-server application or a software-as-a-service (Saas) application, among other possibilities. As another possible implementation, a construction management software application may include front-end software that runs on client devices without interaction with a back-end computing platform. These construction management software applications may take other forms as well.

Figure 1:
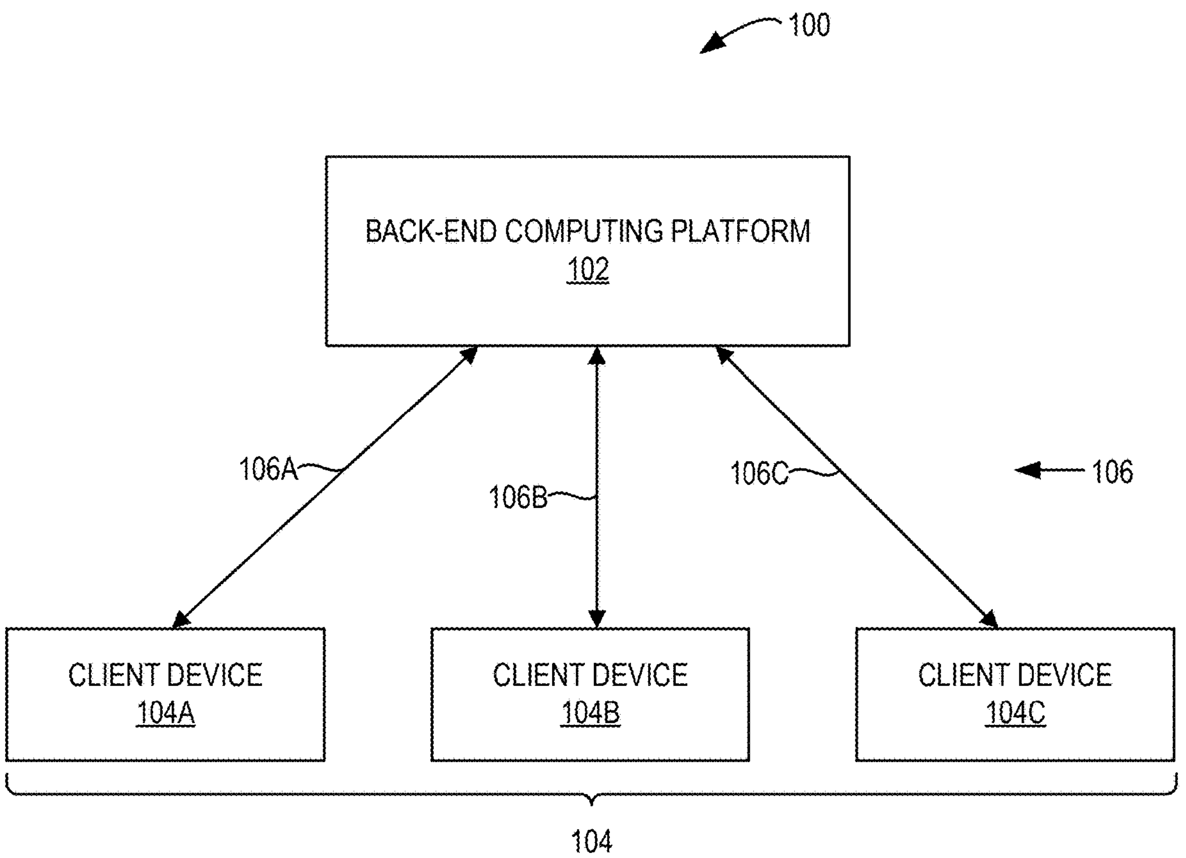
FIG. 1 depicts an example network configuration in which example described herein may be implemented.

Turning now to the figures, FIG. 1 depicts an example network environment 100 in which a construction management software application may be implemented. As shown in FIG. 1, the network environment 100 includes a back-end computing platform 102 that may be communicatively coupled to one or more client devices 104, which as shown includes the client device 104A, the client device 104B, and the client device 104C. Although the client devices 104 are depicted by three devices as shown for the sake of simplicity in illustration, it should be understood that the client devices 104 may represent more or less than three devices without departing from the spirit and scope of this disclosure.

Broadly speaking, the back-end computing platform 102 may comprise one or more computing systems that have been provisioned with back-end software for a construction management software application, which may include program code for carrying out one or more of the platform-side functions disclosed herein. The one or more computing systems of the back-end computing platform 102 may collectively comprise some set of physical computing resources (e.g., one or more processors, data storage system, communication interfaces, etc.), which may take various forms and be arranged in various manners.

For instance, as one possibility, the back-end computing platform 102 may comprise computing infrastructure of a public, private, and/or hybrid cloud (e.g., computing and/or storage clusters) that has been provisioned with back-end software for the construction management software application. In this respect, the entity that owns and operates the back-end computing platform 102 may supply its own cloud infrastructure or obtain the cloud infrastructure from a third-party provider of "on demand" computing resources, such as Amazon Web Services (AWS) or the like. As another possibility, the back-end computing platform 102 may comprise one or more dedicated servers that have been provisioned with back-end software for the construction management software application.

Further, in practice, the back-end software installed at the back-end computing platform 102 may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

Further yet, although not shown in FIG. 1, the back-end software installed at the back-end computing platform 102 may interact with a data storage layer of the back-end computing platform 102, which may comprise data stores of various different forms, examples of which may include relational databases (e.g., Online Transactional Processing (OLTP) databases), NoSQL databases (e.g., columnar databases, document databases, key-value databases, graph databases, etc.), file-based data stores (e.g., Hadoop Distributed File System), object-based data stores (e.g., Amazon S3), data warehouses (which could be based on one or more of the foregoing types of data stores), data lakes (which could be based on one or more of the foregoing types of data stores), message queues, or streaming event queues, among other possibilities.

The back-end computing platform 102 may comprise various other components and take various other forms as well.

In turn, the client devices 104 may each be any computing device that is capable of running front-end software of the construction management software application, which may include program code for carrying out the client-side functions disclosed herein. In this respect, the client devices 104 may each include hardware components such as one or more processors, computer-readable mediums, communication interfaces, and input/output (I/O) components (or interfaces for connecting thereto), among others, as well as software components that facilitate the client device's ability to run the front-end software (e.g., operating system software, web browser software, etc.). As representative examples, the client devices 104 may each take the form of a desktop computer, a spatial computer, a laptop, a netbook, a tablet, a smartphone, and/or a personal digital assistant (PDA), among other possibilities.

As further depicted in FIG. 1, the back-end computing platform 102 is configured to interact with the client devices 104 over respective communication paths 106, of which communication paths 106A, 106B, and 106C are shown as examples. In this respect, each respective communication path 106 between the back-end computing platform 102 and one of the client devices 104 may generally comprise one or more communication networks and/or communications links, which may take any of various forms. For instance, each respective communication path 106 with the back-end computing platform 102 may include any one or more of Personal Area Networks (PANs), Local-Area Networks (LANs), Wide-Area Networks (WANs) such as the Internet or cellular networks, cloud networks, and/or point-to-point links, among other possibilities. Further, the communication networks and/or links that make up each respective communication path 106 with the back-end computing platform 102 may be wireless, wired, or some combination thereof, and may carry data according to any of various different communication protocols. Further yet, communications over each respective communication path 106 could be carried out via an Application Programming Interface (API), among other possibilities. Still further, although not shown, the respective communication paths 106 between the client devices 104 and the back-end computing platform 102 may also include one or more intermediate systems. For example, it is possible that the back-end computing platform 102 may communicate with a given client device 104 via one or more intermediary systems, such as a host server (not shown). The respective communication paths 106 between the back-end computing platform 102 and the client devices 104 may take other forms as well.

Although not shown in FIG. 1, the back-end computing platform 102 may also be configured to receive data, such as data related to a construction project, from one or more external data sources, such as an external database and/or another back-end computing platform or platforms. Such data sources—and the data output by such data sources—may take various forms.

It should be understood that the network environment 100 depicted in FIG. 1 is one example of a network environment in which a construction management software application may be implemented. Numerous other arrangements are possible and contemplated herein. For instance, other network configurations may include additional components not pictured and/or more or fewer of the pictured components.

When a given party (e.g., a company or individual involved in the construction industry) wishes to utilize an existing construction management software application, the given party may begin by (i) creating an account with the construction management software application and (ii) adding a set of one or more individuals associated with the given party as users on the given party's account. Thereafter, the construction management software application may enable the users of the given party to create, store, view, and/or interact with digital data related to construction projects that involve the given party.

For instance, for each of one or more construction projects that involve the given party, the construction management software application may enable users of the given party to create a new project workspace for the construction project (or join an existing project workspace for the construction project that was previously created) and then (ii) create, store, view, and/or interact with any of various types of digital data objects related to the construction project, which may be referred to herein as "project-related data objects."

In practice, each different type of project-related data object that is supported by a construction management software application may be designed to serve a particular purpose within the construction management software application and may comprise a particular set of data elements that facilitate that particular purpose. For instance, a first type of project-related data object may be designed to serve a first purpose within the construction management software application and may comprise a first set of data elements, a second type of project-related data object may be designed to serve a second purpose within the construction management software application and may comprise a second set of data elements that differs from the first set of data elements, and so on for each of the other types of project-related data objects. In this way, the users of the construction management software application may utilize different types of project-related data objects to manage different aspects of the construction project.

As some representative examples, the types of project-related data objects that may be supported by a construction management software application may include submittal data objects (e.g., a data object comprising data that represents an item submitted by a responsible contractor to a general contractor of a construction project for review and approval), schedule-item data objects (e.g., a data object comprising data that represents a task, event, or milestone within a schedule for a construction project), photo data objects (e.g., a digital image), observations data objects (e.g., a data object comprising data that represents observed conditions and/or associated effects of said conditions during a construction project at a point in time during the course of the construction project), punch item data objects (e.g., a data object comprising data that represents a work item on a construction project that must be completed to conform to a construction project's contract specifications), daily log data objects (e.g., a data object comprising data that represents construction activity within a given timeframe, such as a day), RFI data objects (e.g., a data object comprising data that represents request for information from one user/party to another user/party and/or the information provided in response to said request), and/or inspection data objects (e.g., a data object comprising data that represents an inspection of a site at some point in time during the course of a construction project), among other types of project-related data objects. In some cases, the construction management software application may also support other types of data objects that are not specific to any particular construction project, such as data objects related to the party or a particular user of the party, among other possibilities.

In at least some implementations, the software features for creating, storing, viewing, and/or interacting with the different types of project-related data objects that are supported by a construction management software application may be arranged into different software "tools" that each correspond to a different type of project-related data object. For instance, a construction management software application may include a "Submittals" tool for creating, storing, viewing, and/or interacting with submittal data objects, a "Schedule" tool for creating, storing, viewing, and/or interacting with schedule-item data objects, a "Task" tool for creating, storing, viewing, and/or interacting with schedule-item data objects, a "Photos" tool for creating, storing, viewing, and/or interacting with photo data objects, an "Observations" tool for creating, storing, viewing, and/or interacting with observations data objects, a "Punch Items/Lists" tool for creating, storing, viewing, and/or interacting with punch list and/or punch item data objects, a "Daily Logs" tool for creating, storing, viewing, and/or interacting with daily log data objects, an "RFIs" tool for creating storing, viewing, and/or interacting with RFI data objects, and/or an "Inspections" tool for creating, storing, viewing, and/or interacting with inspections data objects, among various other examples of software tools that may be included within a construction management software application. However, in other implementations, the software features for creating, storing, viewing, and/or interacting with the different types of data objects that are supported by a construction management software application may be arranged in other manners (e.g., software features that operate across multiple different types of data objects) that are not based solely on a software tools paradigm.

One example software tool that is included in Procore's existing construction management software application is a submittals tool that enables users to create, store, view, and interact with submittal data objects. To facilitate this functionality, the submittals tool provides a GUI comprising several GUI views that enable users to perform these tasks.

For instance, such a submittals tool may present a first GUI view that shows a listing of submittals related to a construction project and allows a user to perform certain actions with respect to the submittal data objects, such as inputting a request to view or edit a submittal data object.

Figure 2A:
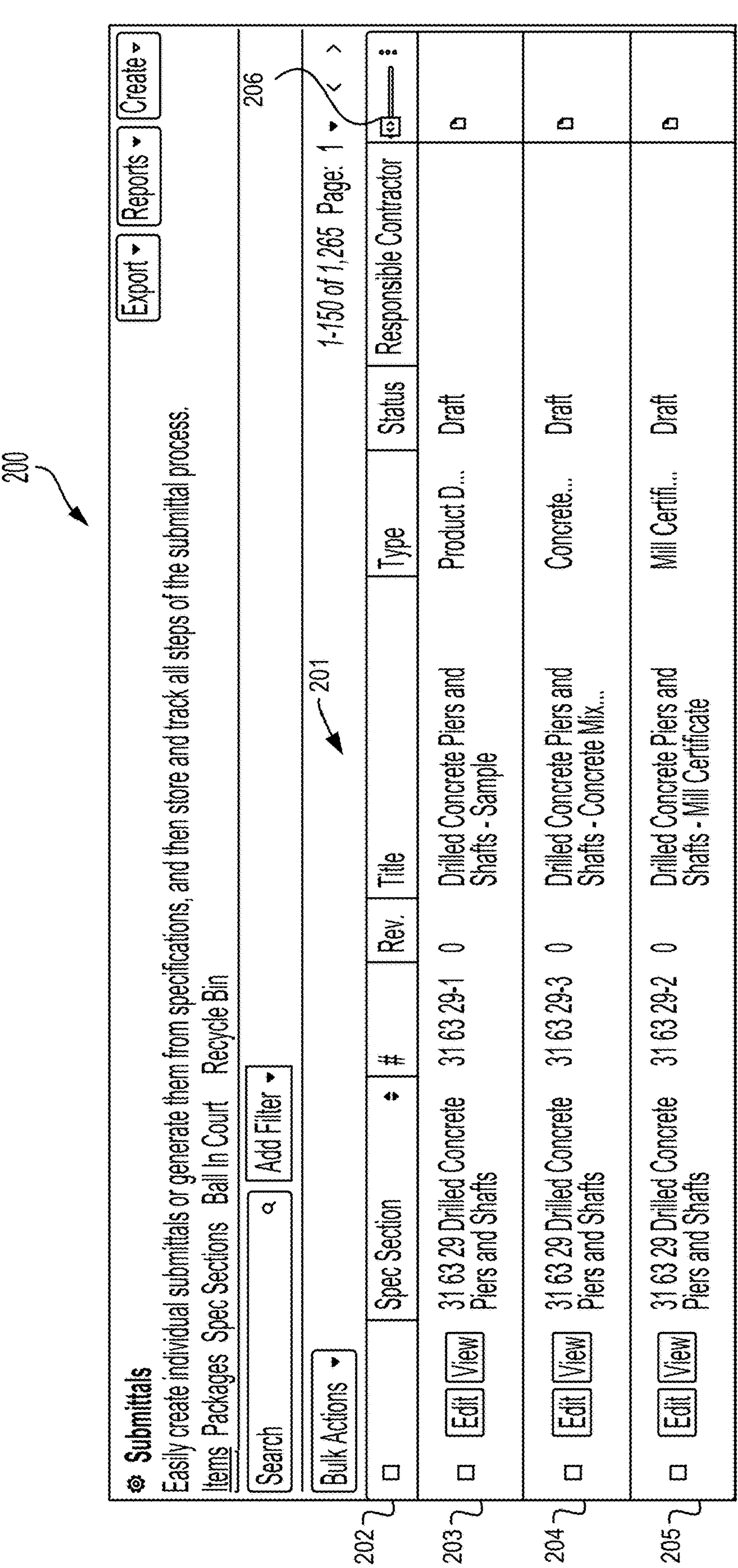
FIG. 2A shows a screenshot of a first GUI view of an example submittals tool of a construction management software application.

FIG. 2A shows a screenshot of a first GUI view 200 of an example submittals tool. As shown, the first GUI view 200 includes a submittal listing 201 for a given construction project, which comprises line items representing respective submittal data objects that have been created and stored for the given construction project. The submittal listing 201 also includes a header row 202 that identifies the data fields contained within the submittal data objects included in the submittal listing 201. As shown, the header row indicates that there are data fields with names such as "Spec Section" (specification section), "#" (ID number), "Rev." (revision number), "Title" (submittal title), "Type" (submittal type), "Status" (which indicates whether the submittal has been approved), and "Responsible Contractor" (contractor who is responsible for the submittal). The slider 206 may also be used to reveal additional names of data fields used in submittals (e.g., "Submit by," "Received From," and "Approvers," "Response," "Sent Date," "Returned Date," "Due Date," "Distributed Date," "Location," "Created At," and "Sub Job").

As one representative example, the first line item 203 shown in the submittal listing 201 represents a respective submittal data object having (i) a first value for the data field labeled "Spec Section" that is "31 63 29 Drilled Concrete Piers and Shafts," which indicates that the respective submittal data object relates to a section of the construction specification that is entitled "31 63 29 Drilled Concrete Piers and Shafts"; (ii) a second value that is "31 63 29-1" for the data field labeled "#," which indicates the that respective submittal data object has the ID number "31 63 29-1," thereby indicating that the respective submittal data object is the first submittal data object that was created related to the "31 63 29 Drilled Concrete Piers and Shafts" section of the construction specification; (iii) a third value that is "0" for the data field labeled "Rev.," which indicates that the respective submittal data object has been revised zero times; (iv) a fourth value that is "Drilled Concrete Piers and Shafts—Sample" for the data field labeled "Title," which indicates that the respective submittal is entitled "Drilled Concrete Piers and Shafts—Sample" (e.g., which suggests that the respective submittal data object refers to a sample of a material that is being submitted for approval to be used in the given construction project); (v) a fifth value that is "Product Data" (abbreviated as "Product D . . . ") for the data field labeled "Type," which indicates that the respective submittal data object includes data about a product (e.g., the material) that is being proposed for use in the given construction project; and (vi) a sixth value that is "Draft" for the data field "Status," indicating that the respective submittal object is a draft (e.g., is not yet a finalized submittal that is ready to be considered for approval).

As another representative example, the second line item 204 shown in the submittal listing 201 represents a respective data submittal object having (i) a first value for the data field labeled "Spec Section" that is "31 63 29 Drilled Concrete Piers and Shafts," which indicates that the respective submittal data object relates to the section of the construction specification that is entitled "31 63 29 Drilled Concrete Piers and Shafts"; (ii) a second value that is "31 63 29-2" for the data field labeled "#," which indicates the that respective submittal data object has the ID number "31 63 29-3," thereby indicating that the respective submittal data object is the third submittal data object that was created related to the "31 63 29 Drilled Concrete Piers and Shafts" section of the construction specification; (iii) a third value that is "0" for the data field labeled "Rev.," which indicates that the respective submittal data object has been revised zero times; (iv) a fourth value that is "Drilled Concrete Piers and Shafts—Concrete Mix Design" for the data field labeled "Title," which indicates that the respective submittal is entitled "Drilled Concrete Piers and Shafts—Concrete Mix Design" (e.g., which suggests that the respective submittal data object refers to a design for a concrete mix that is being submitted for approval to be used in the given construction project); (v) a fifth value that is "Concrete Mix Design" for the data field labeled "Type," which indicates that the respective submittal data object includes data about a concrete mix design that is being proposed for use in the given construction project; and (vi) a sixth value that is "Draft" for the data field "Status," indicating that the respective submittal object is a draft (e.g., is not yet a finalized submittal that is ready to be considered for approval).

As yet another representative example, the third line item 204 shown in the submittal listing 201 represents a respective data submittal object having (i) a first value for the data field labeled "Spec Section" that is "31 63 29 Drilled Concrete Piers and Shafts," which indicates that the respective submittal data object relates to the section of the construction specification that is entitled "31 63 29 Drilled Concrete Piers and Shafts"; (ii) a second value that is "31 63 29-2" for the data field labeled "#," which indicates the that respective submittal data object has the ID number "31 63 29-2," thereby indicating that the respective submittal data object is the second submittal data object that was created related to the "31 63 29 Drilled Concrete Piers and Shafts" section of the construction specification; (iii) a third value that is "0" for the data field labeled "Rev.," which indicates that the respective submittal data object has been revised zero times; (iv) a fourth value that is "Drilled Concrete Piers and Shafts—Concrete Mix Design" for the data field labeled "Title," which indicates that the respective submittal is entitled "Drilled Concrete Piers and Shafts—Concrete Mix Design" (e.g., which suggests that the respective submittal data object refers to a design for a concrete mix that is being submitted for approval to be used in the given construction project); (v) a fifth value that is "Mill Certificate" for the data field labeled "Type," which indicates that the respective submittal data object includes data about mill certificate (also called a mill test report (MTR)) that verifies the chemical and physical properties of a material that is being proposed for use in the given construction project; and (vi) a sixth value that is "Draft" for the data field "Status," indicating that the respective submittal object is a draft (e.g., is not yet a finalized submittal that is ready to be considered for approval).

In addition to showing the data-field values for a respective submittal data object, each line item also includes (i) an "Edit" button that allows a user to input a request to edit the respective submittal data object and (ii) a "View" button that allows a user to input a request to view the respective submittal data object.

As shown, the first GUI view 200 also provides the user with the ability to perform other actions with respect to submittal data objects, such as by further including a "Create" button that allows a user to input a request to create a new submittal data object.

When a user inputs a request to view a given submittal data object (e.g., by clicking on the "View" button in one of the line items shown in FIG. 2A), the submittal tool may then present a second GUI view that shows the details of the given submittal data object and enables the user to perform certain actions with respect to the given submittal data object.

Figure 2B:
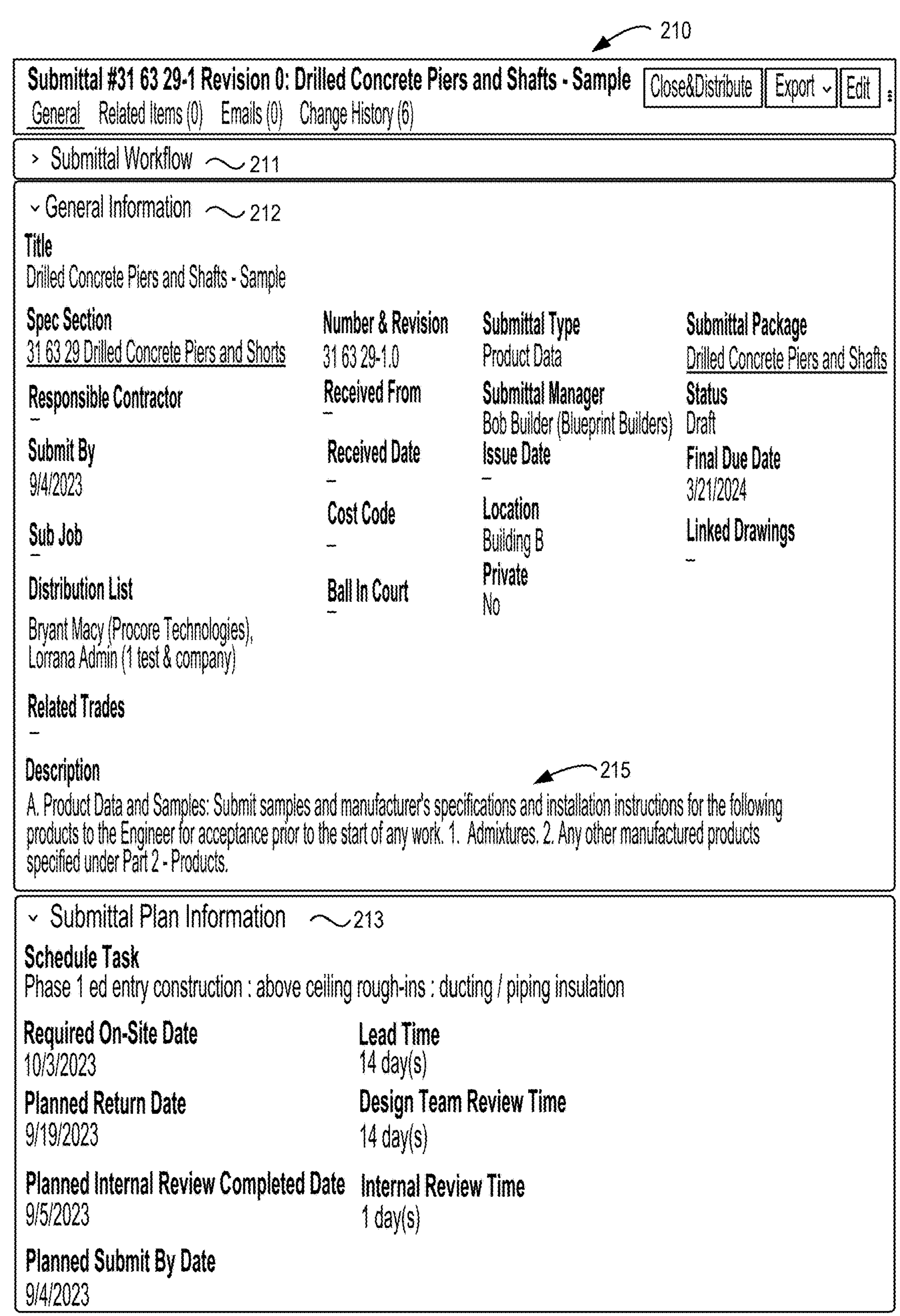
FIG. 2B shows a screenshot of a second GUI view of the example submittals tool that may be presented when a user requests to view a given submittal data object.

FIG. 2B shows a screenshot of a second GUI view 210 of the example submittals tool that may be presented when a user requests to view a given submittal data object. As shown, the second GUI view 210 includes a tile 211 entitled "Submittal Workflow." The tile 211 is shown in collapsed form, but may be expanded to show details of the workflow for the submittal depicted in the second GUI view 210. For example, in expanded form (not shown), the tile 211 would show a list of people who have been designated to review and approve the submittal.

The second GUI view 210 also includes a tile 212 entitled "General Information." The tile 211 is shown in expanded form so that a number of data fields and the corresponding values for those data fields are shown. For instance, as was also indicated by the first line item 203 in FIG. 2A, the value for the data field entitled "Status" is "Draft" (which indicates that the submittal is not yet finalized) and the value for the data field entitled "Title" is "Drilled Concrete Piers and Shafts—Sample" (e.g., which suggests that the given submittal data object depicted in FIG. 2B refers to a sample of a material that is being submitted for approval to be used in the given construction project). The names of other data fields and their corresponding values are also shown. For instance, the textual description 215 is the value for the data field entitled "Description." Also note that a value of "—" for a data field indicates that a user has not specified a value for that data field.

The second GUI view 210 further includes a tile 213 entitled "Submittal Plan Information." The tile 213 is shown in expanded form. As shown, the tile 213 a data field entitled "Schedule Task," which a given schedule-item data object that has been identified by a user as being related to the given submittal data object. In this example, the "Schedule Task" data field is shown to have a value of "Phase 1 ed entry construction: above ceiling rough-ins: ducting/piping insulation," which indicates that the given submittal data object is related to a schedule-item data object of that name that has previously been created for the construction project.

Figure 2C:
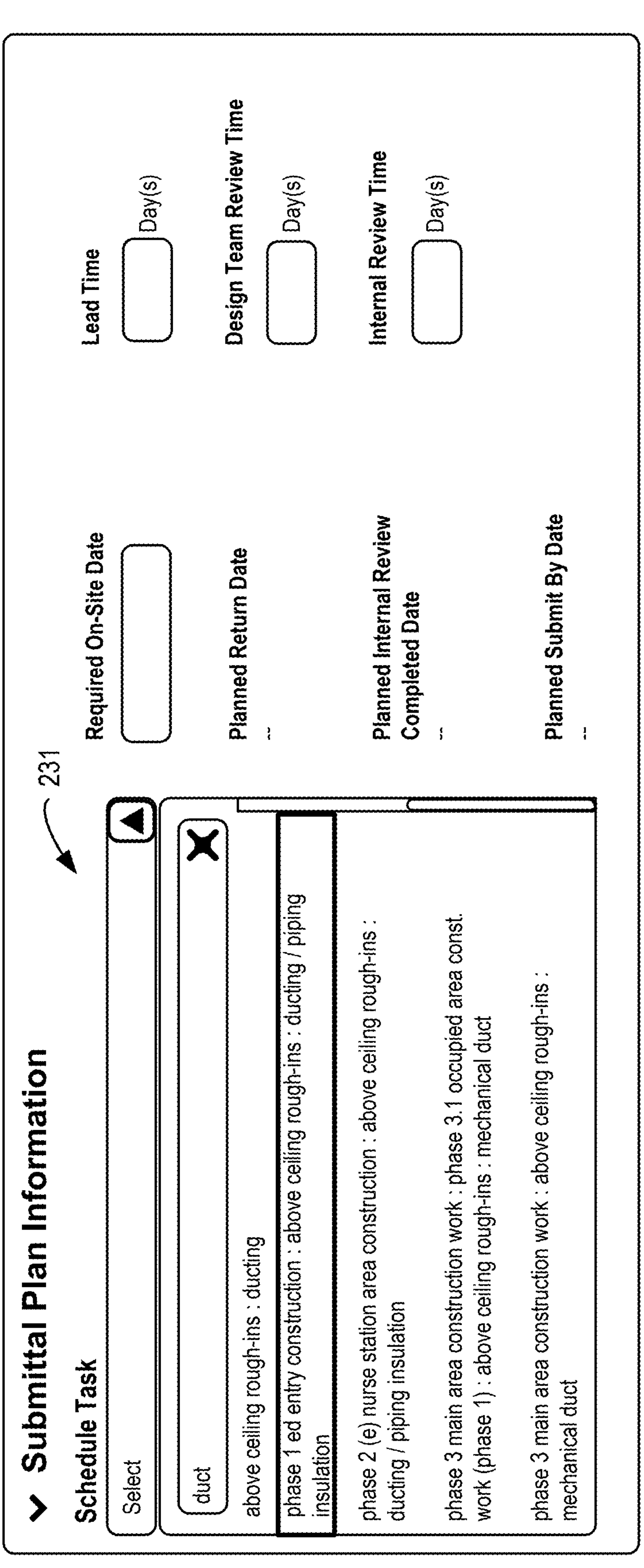
FIG. 2C shows an example of a GUI view tile in which a user can identify a schedule-item data object that is related to a given submittal data object being created or edited.

In operation, a user may input an identification of a schedule-item data object that is related to the given submittal data object on either the GUI view for creating the given submittal data object or the GUI view for editing the given submittal data object. An example of a GUI view tile 230 in which the user can identify a schedule-item data object that is related to a given submittal data object being created or edited is shown in FIG. 2C. As shown, the example GUI view tile 230 includes a dropdown element 231 that, when expanded, shows a list of previously created schedule items that can be selected by the user in order to identify one particular schedule item that is related to the given submittal data object.

Returning to FIG. 2B, as shown, the tile 213 of second GUI view 210 also includes data field entitled "Required On-site Date," "Planned Return Date," "Planned Internal Review Completed Date," "Planned Submit By Date," "Lead Time," "Design Review Time," and "Internal Review Time," which include values that timing information for the given submittal data object. This timing information may at times be referred to as the "submittal plan" for the given submittal data object.

The second GUI view 210 also includes a tile 214 entitled "Delivery Information." The tile 214 is shown in collapsed form. If expanded, the tile 214 would list a data field entitled "Anticipated Delivery Date" (e.g., the date the material described by the given submittal data object is to be delivered to a site of the given construction project) and a field entitled "Actual Delivery Date" (e.g., the date that the material was actually delivered to a site of the given construction project) and the respective data-field values for each.

The submittal tool may also include a third GUI view (not shown) for creating a new submittal data object. The third GUI view may be presented, for example, when a user requests to create a new submittal data object (e.g., by clicking on the "Create" button shown in FIG. 2A). Like the second GUI view 210, the third GUI view may include data fields that are labeled with the names of the data fields for a submittal data object and allow a user to enter values into the data fields for the new submittal data object that the user wishes to create.

The submittal tool may also include various other GUI views as well.

Another example software tool that is included in Procore's existing construction management software application is a schedule tool that enables users to create, store, view, and interact with schedules comprising schedule-item data objects. To facilitate this functionality, the schedule tool provides a GUI comprising a GUI view that enables users to perform these tasks.

For instance, such a schedule tool may present a GUI view that shows a listing of schedule items related to a construction project and allows a user to perform certain actions with respect to the corresponding schedule-item data objects, such as inputting a request to view or edit a schedule-item data object.

Figure 2D:
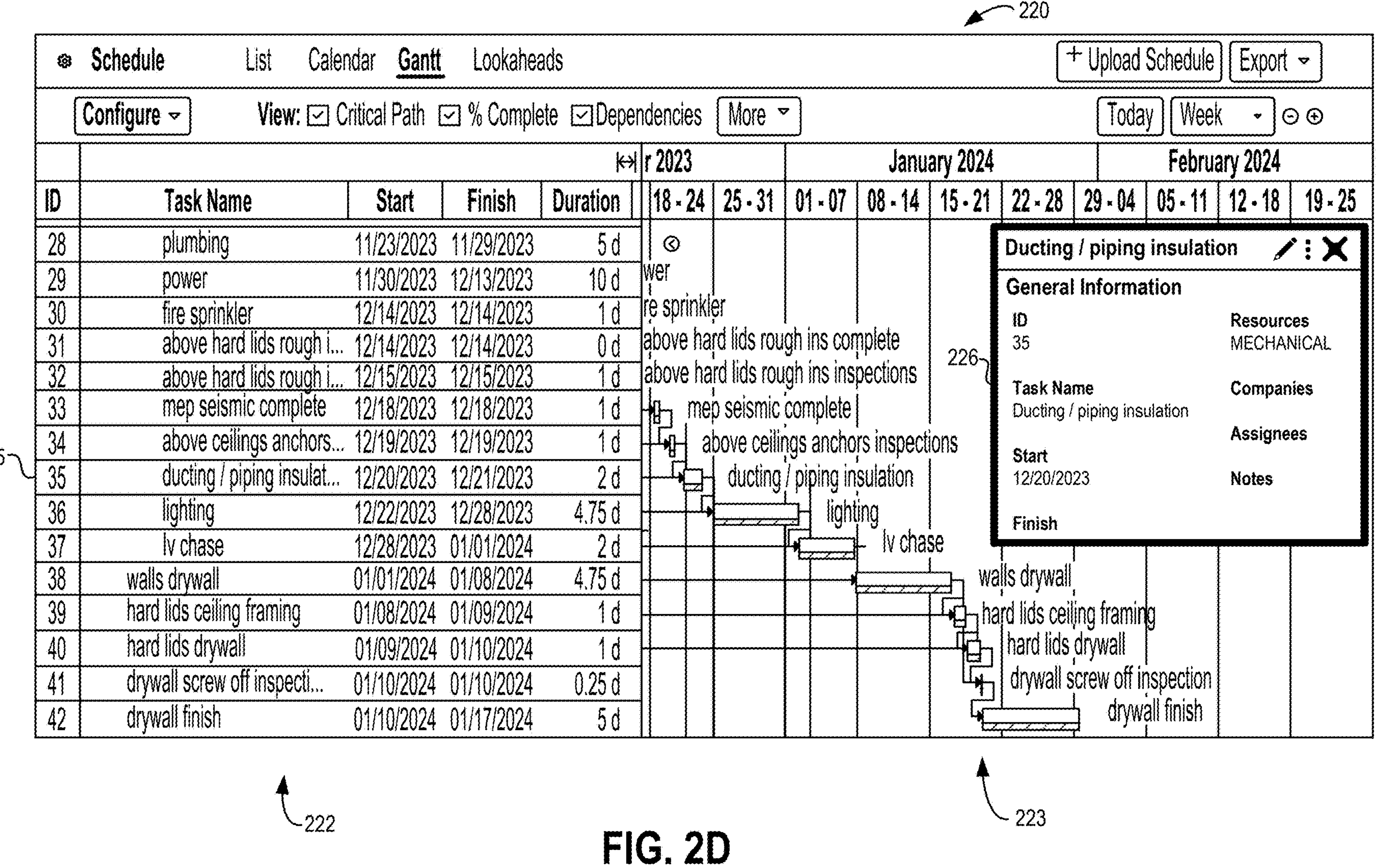
FIG. 2D shows a screenshot of a GUI view of an example schedule tool.

FIG. 2D shows a screenshot of a GUI view 220 of an example schedule tool. As shown, the GUI view 220 includes a schedule-item listing 222 for a given construction project, which comprises line items representing respective schedule-item data objects that have been created and stored for the given construction project. The GUI view 220 also includes a calendar 223 that uses blocks to indicate respective data ranges for the schedule-item data objects indicated by the line items in the schedule-item listing 222. The respective date range for a schedule-item data object may indicate one or more days in which a schedule task represented by the schedule-item data object is expected to be carried out. In addition, the calendar 223 illustrates dependencies between the schedule-item data objects via connections between the blocks.

When a user inputs a request to view a given schedule-item data object (e.g., by clicking on one of the line items shown in the schedule-item listing 222), the schedule tool may then present a sidebar that shows the details of the given schedule-item data object and enables the user to perform certain actions with respect to the given schedule-item data object.

In the GUI view 220, the line item 225 has been selected (e.g., as indicated by the bold outline surrounding the line item 225). As a result, a sidebar 226 that allows a user to view more details about the schedule-item data object represented by the line item 225 is shown.

As shown, the sidebar 226 displays values for the data fields entitled "ID," "Task Name," and "Resource." In addition, the sidebar 226 shows several data fields for which no values are listed—namely, the data fields entitled "Finish" (indicating a completion date for the schedule task represented by the given schedule-item data object), "Companies," "Assignees" (indicating who has been assigned to complete the schedule task represented by the given schedule-item data object) and "Notes."

The schedule tool may also include various other GUI views as well.

Further, along similar lines, the various other software tools of an existing construction management software application may have respective GUIs that enable users to carry out various actions within those software tools.

While the software design of existing construction management software applications such as the one described above may provide various advantages for its users, existing construction management software applications may still have various technical limitations that negatively impact user experience. One such technical limitation is that existing construction management software applications provide only limited functionality (if any) for identifying relationships between data objects of different types that are created and stored within the construction management software application, despite the fact that there are often relationships (e.g., dependencies) between data objects of different types that can have a significant impact on the management of a construction project.

For example, schedule-item data objects are often closely related to submittal data objects. If a given schedule task involves using a particular type of equipment and/or material, the given schedule task should not be commenced (nor completed) until a submittal proposing the use of the particular type of equipment and/or material is approved. As a result, if approval of the submittal is delayed past a target completion date for the given schedule task, completion of the given schedule task will also be delayed. By contrast, if a party responsible for approving the submittal could be apprised of this relationship between the given schedule task and the submittal, the party could prioritize approving the submittal in a timeframe that would allow the given schedule task to be completed on or before the target completion date.

However, existing construction management software applications only provide limited functionality, if any, for specifying the relationships between schedule-item data objects and submittal data objects within the construction management software application. For instance, in the submittal and schedule tools of Procore's existing construction management software application described above, the only functionality that allows users to specify the relationships between schedule-item data objects and submittal data objects is by using the Schedule Task data field described above to identify one particular schedule-item data object that is related to a submittal data object, but this existing functionality includes a number of limitations, including that (i) it only allows a user to identify a single schedule-item data object that is related to the submittal data object despite the fact that there may be multiple different schedule-item data objects that are related to the submittal data object, (ii) it relies on the user to identify which schedule-item data object is related to the submittal data object rather than determining that relationship automatically based on an analysis of the schedule-item and submittal data objects, which gives rise to inaccurate and/or incomplete identifications of relationships between schedule-item and submittal data objects, and (iii) the only functional purpose served by the user-identified schedule-item data object is that this information may subsequently be displayed to users who are viewing submittals in the submittal tool.

Moreover, as explained above, the schedule tool does not even provide users with any comparable functionality for identifying relationships between schedule-item data objects and submittal data objects, which further limits the usefulness of the existing functionality described above because users cannot input or view any relationships between schedule-item data objects and submittal data objects within the schedule tool.

Along similar lines, existing construction management software applications lack functionality for identifying (and surfacing) relationships between other types data objects as well.

To address these and other technical problems associated with existing construction management software applications, disclosed herein is an artificial intelligence (AI) architecture for identifying relationships between data objects of different types within a construction management software application. At a high level, the disclosed AI architecture may comprise a plurality of AI agents that are each preconfigured to perform particular AI-based functionality for determining relationships between data objects of two particular types, such as by determining which schedule-item data objects are related to a given submittal data object in response to a request by a user (or vice versa). Along with the plurality of AI agents, the disclosed AI architecture may include an AI agent supervisor that functions to route requests to the appropriate AI agent(s) and a search component that is utilized by the AI agents to identify candidate data objects that may be related to a particular data object identified by a user. The components of the disclosed AI architecture are described in further detail below.

The disclosed AI architecture may improve upon the existing construction management software applications in various ways. For example, the disclosed AI architecture provides a framework for automatically, accurately, and efficiently identifying relationships between data objects of different types (or the same type) within a construction management software application in response to requests by users for such information, which improves over the limited functionality for identifying relationships between data objects of different types that is described above. As another example, the disclosed AI architecture is flexible and extendible in that new AI agents can be added whenever there is a need to identify relationships between a new pairing of object types and/or respond to new types of user requests related to relationships between data objects of different types, which further improves upon the limited existing functionality and design of existing construction management software applications. The disclosed AI architecture also provides other improvements over the existing construction management software applications, as will be appreciated based on the discussion that follows.

Figure 3:
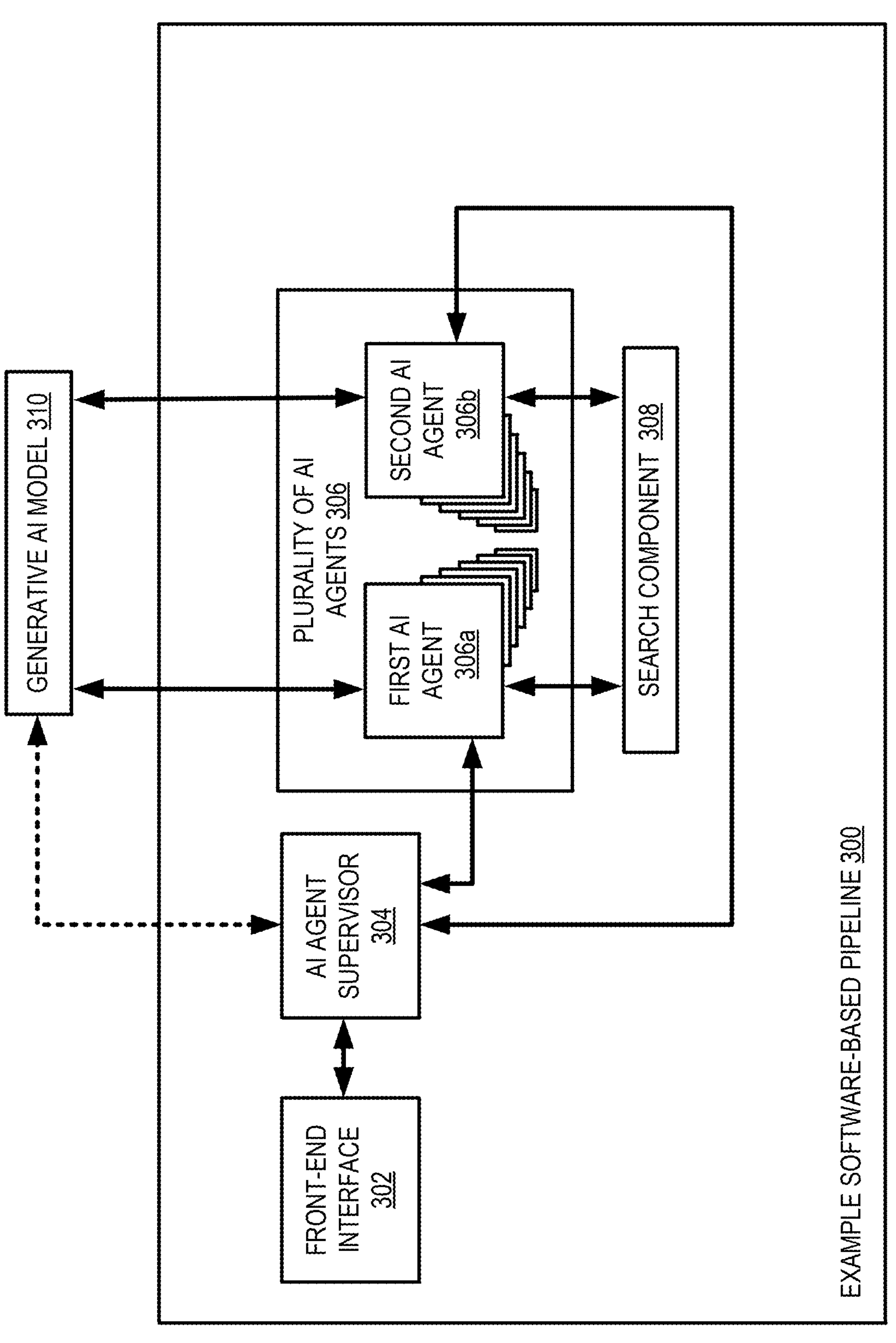
FIG. 3 shows an example software-based pipeline.

Turning now to FIG. 3, an example 300 of the disclosed software-based pipeline comprising the disclosed AI architecture is illustrated. In practice, the example software-based pipeline 300 may be encoded in the form of program instructions that are executable by one or more processors of a computing platform, and for purposes of illustration, the example software-based pipeline 300 is described as being installed on and executed by the back-end computing platform 102 of FIG. 1 that is running back-end software for a construction management software application, but it should be understood that the example software-based pipeline 300 may be installed on and executed by any one or more computing platforms that are capable of performing the example operations of the example software-based pipeline 300. Further, it should be understood that the example software-based pipeline 300 is merely described in this manner for the sake of clarity and explanation and that the example operations may be implemented in various other manners, including the possibility that operations may be added, removed, rearranged into different orders, combined into fewer blocks, and/or separated into additional blocks depending upon the particular example.

As shown in FIG. 3, the example software-based pipeline 300 comprises a front-end interface 302, an AI agent supervisor 304, a plurality of AI agents 306 that are each preconfigured to perform AI-based functionality for accomplishing a particular task, and a search component 308, among other possible components that may be included in the example software-based pipeline 300. Additionally, as shown in FIG. 3, the example software-based pipeline 300 may interface with at least one generative AI model 310, which may either be hosted on a separate computing platform that is accessible over a network-based communication path (e.g., via an API or the like) or be hosted on the back-end computing platform 102. Each of these components will now be described in further detail.

To begin, the front-end interface 302 generally functions to interface with client devices running the front-end software for the construction management software application, such as the client devices 104 of FIG. 1, so as to receive communications from the client devices 104 via the communication paths 106 and/or send communications to the client devices 104 via the communication paths 106. For instance, at a high level, the functionality performed by the front-end interface 302 in accordance with the present disclosure may involve (i) receiving, from a client device 104, a request to identify relationships between data objects of different types that are supported by the construction management software application, (ii) passing the received request to the AI agent supervisor 304, (iii) receiving a response to the request from the AI agent supervisor 304, and (iv) sending the response to the client device 104 and thereby causing the client device 104 to present the response to the user.

The request to identify relationships between data objects that is received by the front-end interface 302 may take any of various forms. For instance, as one possibility, the request may take the form of a request to identify data objects of a first type that relate to a given data object of a second type, where the pairing of the first and second types of data objects may take any of various forms. As one representative example, the first type of data object may be a submittal and the second type of data object may be a schedule item, or vice versa. Or as another representative example, the first type of data object may be an observation and the second type of data object may be a photo, or vice versa. Many other examples of pairings between first and second types of data objects are possible as well. (e.g., using any of the other types of data objects described above).

Further, in practice, the request to identify relationships between data objects that is received by the front-end interface 302 may be generated and sent by the client device 104 based on user input that is received by the client device 104. For instance, as one possibility, a user may access and use the front-end software running on the client device 104 to input a natural language request to identify relationships between data objects within the construction management software application, such as a text-based or voice-based request that is input via a chat interface on the client device 104. In this respect, the chat interface may be accessed on any of various GUI views of the construction management software application. Or as another possibility, a user may access and use the front-end software running on the client device 104 to interact with one or more input-control elements that, when selected, initiate a request to identify relationships between data objects within the construction management software application. In either case, the client device 104 may then encode the user's request into a communication that is sent to the back-end computing platform 102. In practice, this communication may take the form of one or more messages (e.g., one or more HyperText Transfer Protocol (HTTP) messages) that are sent over the communication path 106 between the client device 104 and the back-end computing platform 102, and in at least some implementations, the communication may be sent via one or more APIs.

The front-end interface 302 may perform other functions as well, including but not limited to the possibility that the front-end interface 302 may receive other types of requests that do not involve an identification of relationships between data objects of different types.

Further, in other implementations, the front-end interface 302 may be configured to pass requests to and/or receive responses from other components of the software-based pipeline 300, including but not limited to the possibility that the front-end interface 302 could receive a response directly from the AI agents 306 rather than from the AI agent supervisor 304.

As noted above, after the request to identify relationships between data objects within the construction management software application is received by the input interface 302, the input interface 302 may pass the request to the AI agent supervisor 304, which may generally function to (i) receive the incoming request to identify relationships between data objects of different types within the construction management software application, (ii) identify at least one AI agent (e.g., from among the plurality of AI agents 306) that is to be utilized to handle the incoming request and thereby determine where to route the incoming request, (iii) route the incoming request to the identified at least one AI agent for handling, (iv) receive a response from the identified at least one AI agent, and (v) pass the response back to the front-end interface 302.

At a high level, the function of identifying the at least one AI agent (e.g., from among the plurality of AI agents 306) that is to be utilized to handle the incoming request may involve determining which of the plurality of AI agents 306 is best suited to handle the incoming request (e.g., which of the plurality of AI agents 306 is preconfigured to perform functionality for producing a response to the incoming request). The AI agent supervisor 304 may make this identification in any of various manners.

As one possibility, the AI agent supervisor 304 may identify the at least one AI agent using the generative AI model 310. In this respect, the AI agent supervisor 304 may (i) generate a prompt comprising a request to determine which of the plurality of AI agents 306 is best suited to handle the incoming request, (ii) pass the prompt as input to the generative AI model 310, (iii) receive a response from the generative AI model 310 comprising a prediction of which of the plurality of AI agents 306 is best suited to handle the incoming request, and then (iv) use that prediction as a basis for identifying the at least one AI agent that is to be utilized to handle the incoming request.

As another possibility, the AI agent supervisor 304 may identify the at least one AI agent using a different type of model, such as a discriminative AI model (e.g., a decision-tree model, neural-network-based model, a regression model, etc.) or a rule-based model. In this respect, the AI agent supervisor 304 may (i) generate a set of feature data based on the incoming request, (ii) pass the set of feature data as input to the discriminative AI or rule-based model, (iii) receive the output of discriminative AI or rule-based model, which may comprise a prediction of which one of the plurality of AI agents 306 is best suited to handle the incoming request, and then (iv) use the output of the discriminative AI rule-based model as a basis for identifying the at least one AI agent is to be utilized to handle the incoming request.

The function of identifying the at least one AI agent that is to be utilized to handle the incoming request may also take other forms.

As noted above, after identifying the at least one AI agent that is to be utilized to handle the incoming request, the AI agent supervisor 304 may route the incoming request to the identified at least one AI agent, which may be included as part of the plurality of AI agents 306. In accordance with the present disclosure, each of the plurality of AI agents 306 may take the form of a software component that provides an interface to a respective AI model (e.g., the generative AI model 310) and is preconfigured to perform particular AI-based functionality in order to accomplish a respective type of task that is preconfigured for the AI agent 306. For instance, as discussed in further detail below, a first AI agent may be preconfigured to perform AI-based functionality for accomplishing a first type of task, a second AI agent may be preconfigured to perform AI-based functionality for accomplishing a second type of task, etc. In some implementations, the plurality of AI agents 306 may each be implemented in the form of a discrete executable software component, which is how the AI agents are shown in FIG. 3 and described below for purposes of illustration. However, it should be understood that in other implementations, the plurality of AI agents 306 may each be implemented in the form of a discrete configuration file (e.g., a YAML file) that, when loaded and executed by a centralized execution engine (e.g., an agent executor), causes the centralized execution engine to perform the functions for the AI agent. In still other implementations, the plurality of AI agents 306 may be implemented in a databases system wherein each AI agent is implemented as an entry in the database system. The plurality of AI agents 306 may take other forms as well.

As shown in FIG. 3, the plurality of AI agents 306 may include a first AI agent 306*a* that is preconfigured to perform AI-based functionality for utilizing the generative AI model 310 to identify data objects of a first type that are related to a given data object of a second type. In this respect, the first and second types of data objects may take any of various forms.

As one possible example, the first type of data object may be a submittal and the second type of data object may be a schedule item, or vice versa. As another possible example, the first type of data object may be any type of data object that may have a relationship with a photo (e.g., a submittal, a schedule item, an observation, a punch item, etc.) and the second type of data object may be a photo, or vice versa. Many other possible examples of the first and second types of data objects are possible as well.

At a high level, the AI-based functionality that the first AI agent 306*a* performs to identify data objects of a first type that are related to a given data object of a second type may involve (i) receiving, from the AI agent supervisor 304, a request to identify data objects of the first type that are related to the given data object of the second type, (ii) generating one or more search queries that seek to identify a candidate set of data objects of the first type that are related to the given data object of the second type, (iii) providing the one or more search queries to the search component 308, (iv) receiving search results back from the search component 308 comprising the candidate set of data objects of the first type, (v) generating a prompt for the generative AI model 310 that comprises a request to determine which of the candidate set of data objects of the first type are related to the given data object of the second type, (vi) passing the prompt as input to the generative AI model 310, (vii) receiving a response from the generative AI model 310 comprising a prediction of which data objects of the first type are related to the given data object of the second type, (viii) using that prediction as a basis for determining a final set of data objects of the first type that are related to the given data object of the second type, and (ix) passing an identification of the final set of data objects of the first type back to the AI agent supervisor 304. Each of these functions may take any of various forms.

To begin, the first AI agent's function of receiving the request to identify data objects of the first type (e.g., schedule items) that are related to the given data object of the second type (e.g., submittals) may involve receiving the request from the AI agent supervisor 304 via an internal communication path (e.g., an internal API, a messaging queue or bus, or some other form of inter-process communication).

In turn, the function that the first AI agent 306*a* performs to generate the one or more search queries that seek to identify the candidate set of data objects of the first type that are related to the given data object of the second type may take any of various forms, which may depend in part on the type of search that is to be performed.

As one possibility, if the search to be performed comprises a text-based search (e.g., as discussed further below with respect to the search component 308), then generating the one or more search queries may comprise (i) identifying, for each of one or more data fields (e.g., formal parameters) defined for data objects of the second type, a respective value (e.g., actual parameters) for the given data object of the second type and (ii) generating a text-based search query that includes the respective values for the one or more data fields. For example, consider a scenario in which data objects of the second type have a project identifier (ID) data field, a company ID data field, a standardized code data field, a title data field, a description data field, a type data field, and a due-date data field. In this scenario, the first AI agent 306*a* may identify respective values for these data fields. For example, if the given data object is in a data interchange format (e.g., Javascript Object Notation (JSON)), the first AI agent 306*a* may identify the respective values for these data fields by parsing the given data object of the second type. In another example, if the given data object is in the form of an instantiated instance of an object class (e.g., that has been coded in an object-oriented programming language such as Python, C #, Java, C++, etc.), the first AI agent 306*a* may identify the respective values for these data fields by calling one or more class methods of the object class via the given data object.

As another possibility, if the search to be performed comprises an embedding-based semantic search (e.g., as discussed further below with respect to the search component 308), then the function of generating the one or more search queries may involve (i) transforming the given data object of the second type into a set of one or more embeddings (also referred to as "vector embeddings" or simply "vectors") and then (ii) generating an embedding-based search query that includes the embedding. In this respect, the function of function of transforming the given data object of the second type into set of one or more embeddings may take any of various forms, and in at least some implementations, may involve (i) pre-processing the given data object of the second type so as to place it into a form that can be input into an embedding model, such as by extracting certain data alphanumeric values from the given data object of the second type and placing them into an alphanumeric text string and/or preparing an image for input to the embedding model, and then (ii) inputting the pre-processed version of the given data object of the second type (e.g., the alphanumeric text string or the image) into the embedding model that functions to generate the set of one or more embeddings.

However, in other implementations, it is possible that the first AI agent 306*a* may pass the given data object of the second type (or a pre-processed version thereof) to the search component 308, which may then function to generate the text-based and/or embedding-based search queries.

In at least some implementations, if the given data object of the second type is linked to other data objects, the first AI agent 306*a* may also carry out similar functions with respect to the linked data objects.

It should also be understood that if multiple different types of searches are to be run by the search component 308, then the first AI agent 306*a* may function to generate multiple different types of search queries, such as both a text-based search query and an embedding-based search query.

The function of generating the one or more search queries may also take other forms.

Returning to the functionality of the first AI agent 306*a*, the first AI agent's functions of providing the one or more search queries to the search component 308 and then receiving the search results back from the search component 308 may involve sending the one or more search queries to and receiving the search results from the search component 308 via an internal communication path (e.g., an internal API, a messaging queue or bus, or some other form of inter-process communication).

Next, the first AI agent's function of generating the prompt for the generative AI model 310 may take any of various forms. For instance, as one possibility, this function may involve generating a prompt that incudes (i) an identification of the given data object of the second type, (ii) an identification of the candidate set of data objects of the first type, (iii) a request for the generative AI model 310 to determine which of the candidate set of data objects of the first type are related to the given data object of the second type, and perhaps also (iv) additional data that may be utilized by the generative AI model 310 when performing the task of determining which of the candidate set of data objects of the first type are related to the given data object of the second type, among other possible aspects of the prompt that may be generated by the first AI agent 306*a*. Each of these aspects of the prompt may take any of various forms.

For instance, the identification of the given data object of the second type may comprise respective values for any of various data fields contained within the given data object of the second type, examples of which may include a name (e.g., a title) of the given data object of the second type, a description of the given data object of the second type, a start, end, and/or due date of the given data object of the second type (if applicable), and/or other values that are extracted from or otherwise derived based on the given data object of the second type, among other possible examples.

Similarly, the identification of the candidate set of data objects of the first type may comprise respective values for any of various data fields contained within data objects found in the candidate set of data objects of the first type, examples of which may include names (e.g., titles) of the candidate set of data objects of the first type, descriptions of the candidate set of data objects of the first type, start, end, due dates of the candidate set of data objects of the first type (if applicable), CSI activity codes of the candidate set of data objects of the first type, keywords associated with those CIS activity codes, and/or other values that are extracted from or otherwise derived based on the candidate set of data objects of the first type, among other possible examples.

Further, the request for the generative AI model 310 to determine which of the candidate set of data objects of the first type are related to the given data object of the second type may take any of various forms, and in at least some implementations, the request may comprise a natural-language query in a form such as "Which of the [candidate set of data objects of the first type] are related to [the given data object of the second type]?" or a natural-language instruction in the form of "Determine which of the [candidate set of data objects of the first type] are related to [the given data object of the second type]," among other possibilities.

Further yet, the additional data that may optionally be included in the prompt may take any of various forms. For instance, as one possibility, the prompt may optionally include an identification of a particular role that the generative AI model 310 should utilize when performing the task of determining which of the candidate set of data objects of the first type are related to the given data object of the second type, such as a particular persona that the generative AI model 310 should take on or a particular perspective from which the generative AI model 310 should interpret the request. In this respect, the prompt that is generated by the first AI agent 306*a* could optionally specify that the generative AI model 310 should interpret the request from the perspective of a particular type of construction professional, such as a contractor, a project manager, a project foreman, etc., among other possible types of construction professionals. To illustrate with a particular example, the prompt could include the phrase "You are a contractor working for a construction company" in order to specify that the generative AI model 310 should interpret the request from the perspective of contractor working for a construction company. Many other examples are possible as well.

As another possibility, the prompt may optionally include a description of certain guidelines that the generative AI model 310 should utilize when performing the task of determining which of the candidate set of data objects of the first type are related to the given data object of the second type. These guidelines may take any of various forms.

One example category of guidelines that may optionally be included in the prompt may comprise guidelines for how to assess the relatedness between data objects of the first type and the given data object of the second type, such as guidelines specifying which values for data fields to assess and how to determine when those values indicate relatedness between data objects of the first type and the given data object of the second type.

Another example category of guidelines that may optionally be included in the prompt may comprise guidelines for how confident the generative AI model 310 should be in its identification of the related data objects in order to include such data objects in the response. Some representative examples of this category of guidelines may include instructions of "if unsure about a value, do not provide a result," "do not include schedule items that match the submittal with a confidence level of less than fifty percent," and/or "include the schedule items whose match scores are among the top five match scores," among other possible.

Yet another example category of guidelines that may optionally be included in the prompt may comprise guidelines for what sources of data should be utilized by the generative AI model 310 when identifying the related objects. Some representative examples of this category of guidelines may include an instruction to limit the identification of the related data objects to the candidate set of data objects of the first type and an instruction to avoid using information from unverified sources, among other possible examples.

Still another example category of guidelines that may optionally be included in the prompt may comprise guidelines for how the generative AI model 310 is to handle errors (e.g., unexpected programmatic behavior such as exceptions, timeouts, etc.). Some representative examples of this category of guidelines may include instructions of "if the function response contains an error or there are no results, handle it gracefully by informing the user," "record any exceptions that occur in a log file," and/or "If network connectivity is interrupted, inform the user and notify the user when network connectivity is restored," among other possible examples.

Other category of guidelines may optionally be included in the prompt as well.

As still another possibility, the prompt may optionally include examples of relationships between data objects of the first type and data objects of the second type, which may be utilized by the generative AI model 310 to help guide its task of determining which of the candidate set of data objects of the first type are related to the given data object of the second type.

As a further possibility, the prompt may optionally include other contextual data that the generative AI model 310 should utilize as context for the task of determining which of the candidate set of data objects of the first type are related to the given data object of the second type, such as additional background details, facts, or the like that may be relevant to the identification of the related data objects (e.g., background details about the construction project).

As still a further possibility, the prompt may optionally include a specification of the output format that is to be utilized by the generative AI model 310 when generating the response (e.g., the layout and/or structure of the response). As representative examples, the specification of the output format may comprise instructions such as "provide the matching schedule items in a list that is sorted in descending order according to the respective confidence levels you determine for those matching schedule items," "provide a structured list of schedule items related to the submittal according to the output schema," or "List the matching schedule items as rows in a table that includes columns for the ID number data field, the title data field, and the description data field," among other possible examples.

The function of generating the prompt for the generative AI model 310 may also take other forms.

Returning again to the functionality of the first AI agent 306*a*, the first AI agent's functions of passing the generated prompt to the generative AI model 310 and receiving the response from the generative AI model 310 comprising the prediction of which data objects of the first type are related to the given data object of the second type may take any of various forms, which may depend in part on where the generative AI model 310 is hosted. For instance, in an implementation where the generative AI model 310 is hosted on a separate computing platform from the back-end computing platform 102, these functions may involve sending the generated prompt to the generative AI model 310 over an external network-based communication path (e.g., via an API or the like) and then receiving the response from the generative AI model 310 over the external network-based communication path. Alternatively, in an implementation where the generative AI model 310 is hosted on the back-end computing platform 102, these functions may involve sending the generated prompt via an internal communication path (e.g., an internal API, a messaging queue or bus, or some other form of inter-process communication) and then receiving the response from the generative AI model 310 over the internal communication path. The functions the first AI agent 306*a* performs to pass the generated prompt to the generative AI model 310 and to receive the response from the generative AI model 310 may take other forms as well.

In turn, the first AI agent's function of using the prediction from the generative AI model 310 as the basis for determining the final set of data objects of the first type that are related to the given data object of the second type may take any of various forms. For instance, as one possibility, this function may involve determining a final set of data objects that includes all of the data objects of the first type that were predicted to be related by the generative AI model 310. As another possibility, this function may involve determining a final set of data objects that includes less than all of the data objects of the first type that were predicted to be related by the generative AI model 310, such as by filtering the list of data objects returned by the generative AI model 306 based on factors such as a target number of data objects to include in the response, a threshold confidence level for the relatedness prediction, or the like. As still another possibility, this function may involve identifying additional data objects of the first type to include in the final set of data objects beyond those that are predicted to be related by the generative AI model 310, such as by identifying additional data objects of the first type that are similar to the data objects of the first type that were predicted to be related by the generative AI model 310. The function of using the prediction from the generative AI model 310 as the basis for determining the final set of data objects of the first type that are related to the given data object of the second type may take other forms as well.

Lastly, the first AI agent's function of passing the identification of the final set of data objects of the first type back to the AI agent supervisor 304 may involve sending the identification of the final set of data objects to the AI agent supervisor 304 via an internal communication path (e.g., an internal API, a messaging queue or bus, or some other form of inter-process communication). In this respect, the identification of the final set of data objects may take any of various forms, including but not limited to a textual description (e.g., a name), a numerical identifier, and/or link to each of the data objects in the final set.

The functionality of the first AI agent 306*a* may take various other forms as well.

As shown in FIG. 3, the plurality of AI agents 306 may further include a second AI agent 306*b* that is preconfigured to perform functionality for utilizing the generative AI model 310 to identify data objects of a third type that are related to a given data object of a fourth type. In this respect, the third and fourth types of data objects may take any of various forms.

As one possible example, the third type of data object may be a submittal and the fourth type of data object may be a schedule item, or vice versa. As another possible example, the third type of data object may be any type of data object that may have a relationship with a photo (e.g., a submittal, a schedule item, an observation, a punch item, etc.) and the fourth type of data object may be a photo, or vice versa. Many other possible examples of the third and fourth types of data objects are possible as well.

At a high level, the AI-based functionality that the second AI agent 306*b* performs to identify data objects of a third type that are related to a given data object of a fourth type may involve (i) receiving, from the AI agent supervisor 304, a request to identify data objects of the third type that are related to the given data object of the fourth type, (ii) generating one or more search queries that seek to identify a candidate set of data objects of the third type that are related to the given data object of the fourth type, (iii) providing the one or more search queries to the search component 308, (iv) receiving search results back from the search component 308 comprising the candidate set of data objects of the third type, (v) generating a prompt for the generative AI model 310 that comprises a request to determine which of the candidate set of data objects of the third type are related to the given data object of the fourth type, (vi) passing the prompt as input to the generative AI model 310, (vii) receiving a response from the generative AI model 310 comprising a prediction of which data objects of the third type are related to the given data object of the fourth type, (viii) using that prediction as a basis for determining a final set of data objects of the third type that are related to the given data object of the fourth type, and (ix) passing an identification of the final set of data objects of the third type back to the AI agent supervisor 304. Each of these functions may take any of various forms.

To begin, the second AI agent's function of receiving the request to identify data objects of the third type (e.g., schedule items) that are related to the given data object of the fourth type (e.g., submittals) may involve receiving the request from the AI agent supervisor 304 via an internal communication path (e.g., an internal API, a messaging queue or bus, or some other form of inter-process communication).

In turn, the function that the second AI agent 306*b* performs to generate the one or more search queries that seek to identify the candidate set of data objects of the third type that are related to the given data object of the fourth type may take any of various forms, which may depend in part on the type of search that is to be performed.

As one possibility, if the search to be performed comprises a text-based search (e.g., a keyword search, as discussed further below with respect to the search component 308), then generating the one or more search queries may comprise (i) identifying, for each of one or more data fields (e.g., formal parameters) defined for data objects of the fourth type, a respective value (e.g., actual parameters) for the given data object of the fourth type and (ii) generating a search query that includes the respective values for the one or more data fields. For example, consider a scenario in which data objects of the fourth type have a project identifier (ID) data field, a company ID data field, a standardized code data field, a title data field, a description data field, a type data field, and a due-date data field. In this scenario, the second AI agent 306*b* may identify respective values for these data fields. For example, if the given data object is in a data interchange format (e.g., JSON), the second AI agent 306*b* may identify the respective values for these data fields by parsing the given data object of the fourth type. In another example, if the given data object is in the form of an instantiated instance of an object class (e.g., that has been coded in an object-oriented programming language such as Python, C #, Java, C++, etc.), the second AI agent 306*b* may identify the respective values for these data fields by calling one or more class methods of the object class via the given data object.

As another possibility, if the search to be performed comprises an embedding-based semantic search (e.g., as discussed further below with respect to the search component 308), then the function of generating the one or more search queries may involve (i) transforming the given data object of the fourth type into a set of one or more embeddings and then (ii) generating an embedding-based search query that includes the embedding. In this respect, the function of function of transforming the given data object of the fourth type into set of one or more embeddings may take any of various forms, and in at least some implementations, may involve (i) pre-processing the given data object of the fourth type so as to place it into a form that can be input into an embedding model, such as by extracting certain data alphanumeric values from the given data object of the fourth type and placing them into an alphanumeric text string and/or preparing an image for input to the embedding model, and then (ii) inputting the pre-processed version of the given data object of the fourth type (e.g., the alphanumeric text string or the image) into the embedding model that functions to generate the set of one or more embeddings.

However, in other implementations, it is possible that the second AI agent 306*b* may pass the given data object of the fourth type (or a pre-processed version thereof) to the search component 308, which may then function to generate the text-based and/or embedding-based search queries.

In at least some implementations, if the given data object of the fourth type is linked to other data objects, the second AI agent 306*b* may also carry out similar functions with respect to the linked data objects.

It should also be understood that if multiple different types of searches are to be run by the search component 308, then the second AI agent 306*b* may function to generate multiple different types search queries, such as both a text-based search query and an embedding-based search query.

The function of generating the one or more search queries may also take other forms.

Returning to the functionality of the second AI agent 306*b*, the second AI agent's functions of providing the one or more search queries to the search component 308 and then receiving the search results back from the search component 308 may involve sending the one or more search queries to and receiving the search results from the search component 308 via an internal communication path (e.g., an internal API, a messaging queue or bus, or some other form of inter-process communication).

Next, the second AI agent's function of generating the prompt for the generative AI model 310 may take any of various forms. For instance, as one possibility, this function may involve generating a prompt that includes (i) an identification of the given data object of the fourth type, (ii) an identification of the candidate set of data objects of the third type, (iii) a request for the generative AI model 310 to determine which of the candidate set of data objects of the third type are related to the given data object of the fourth type, and perhaps also (iv) additional data that may be utilized by the generative AI model 310 when performing the task of determining which of the candidate set of data objects of the third type are related to the given data object of the fourth type, among other possible aspects of the prompt that may be generated by the second AI agent 306*b*. Each of these aspects of the prompt may take any of various forms.

For instance, the identification of the given data object of the fourth type may comprise respective values for any of various data fields contained within the given data object of the fourth type, examples of which may include a name (e.g., a title) of the given data object of the fourth type, a description of the given data object of the fourth type, a start, end, and/or due date of the given data object of the fourth type (if applicable), and/or other values that are extracted from or otherwise derived based on the given data object of the fourth type, among other possible examples.

Similarly, the identification of the candidate set of data objects of the third type may comprise respective values for any of various data fields contained within data objects found in the candidate set of data objects of the third type, examples of which may include names (e.g., titles) of the candidate set of data objects of the third type, descriptions of the candidate set of data objects of the third type, start, end, and/or due dates of the candidate set of data objects of the third type (if applicable), and/or other values that are extracted from or otherwise derived based on the candidate set of data objects of the third type, among other possible examples.

Further, the request for the generative AI model 310 to determine which of the candidate set of data objects of the third type are related to the given data object of the fourth type may take any of various forms, and in at least some implementations, the request may comprise a natural-language query in a form such as "Which of the [candidate set of data objects of the third type] are related to [the given data object of the fourth type]?" or a natural-language instruct in the form of "Determine which of the [candidate set of data objects of the third type] are related to [the given data object of the fourth type]," among other possibilities.

Further yet, the additional data that may optionally be included in the prompt may take any of various forms. For instance, as one possibility, the prompt may optionally include an identification of a particular role that the generative AI model 310 should utilize when performing the task of determining which of the candidate set of data objects of the third type are related to the given data object of the fourth type, such as a particular persona that the generative AI model 310 should take on or a particular perspective from which the generative AI model 310 should interpret the request. In this respect, the prompt that is generated by the second AI agent 306*b* could optionally specify that the generative AI model 310 should interpret the request from the perspective of a particular type of construction professional, such as a contractor, a project manager, a project foreman, etc., among other possible types of construction professionals. To illustrate with a particular example, the prompt could include the phrase "You are a contractor working for a construction company" in order to specify that the generative AI model 310 should interpret the request from the perspective of contractor working for a construction company. Many other examples are possible as well.

As another possibility, the prompt may optionally include a description of certain guidelines that the generative AI model 310 should utilize when determining which of the candidate set of data objects of the third type are related to the given data object of the fourth type. These guidelines may take any of various forms.

One example category of guidelines that may optionally be included in the prompt may comprise guidelines for how to assess the relatedness between data objects of the third type and the given data object of the fourth type, such as guidelines specifying which values for data fields to assess and how to determine when those values indicate relatedness between data objects of the third type and the given data object of the fourth type.

Another example category of guidelines that may optionally be included in the prompt may comprise guidelines for how confident the generative AI model 310 should be in its identification of the related data objects in order to include such data objects in the response. Some representative examples of this category of guidelines may include instructions of "if unsure about a value, do not provide a result," "do not include schedule items that match the submittal with a confidence level of less than fifty percent," and/or "include the schedule items whose match scores are among the top five match scores," among other possible.

Yet another example category of guidelines that may optionally be included in the prompt may comprise guidelines for what sources of data should be utilized by the generative AI model 310 when identifying the related objects. Some representative examples of this category of guidelines may include an instruction to limit the identification of the related data objects to the candidate set of data objects of the third type and an instruction to avoid using information from unverified sources, among other possible examples.

Still another example category of guidelines that may optionally be included in the prompt may comprise guidelines for how the generative AI model 310 is to handle errors (e.g., unexpected programmatic behavior such as exceptions, timeouts, etc.). Some representative examples of this category of guidelines may include instructions of "if the function response contains an error or there are no results, handle it gracefully by informing the user," "record any exceptions that occur in a log file," and/or "If network connectivity is interrupted, inform the user and notify the user when network connectivity is restored," among other possible examples.

Other categories of guidelines may optionally be included in the prompt as well.

As still another possibility, the prompt may optionally include examples of relationships between data objects of the third type and data objects of the fourth type, which may be utilized by the generative AI model 310 to help guide its task of determining which of the candidate set of data objects of the third type are related to the given data object of the fourth type.

As a further possibility, the prompt may optionally include other contextual data that the generative AI model 310 should utilize as context for the task of determining which of the candidate set of data objects of the third type are related to the given data object of the fourth type, such as additional background details, facts, or the like that may be relevant to the identification of the related data objects (e.g., background details about the construction project).

As still a further possibility, the prompt may optionally include a specification of the output format that is to be utilized by the generative AI model 310 when generating the response (e.g., the layout and/or structure of the response). As representative examples, the specification of the output format may comprise instructions such as "provide the matching schedule items in a list that is sorted in descending order according to the respective confidence levels you determine for those matching schedule items," "provide a structured list of schedule items related to the submittal according to the output schema," or "List the matching schedule items as rows in a table that includes columns for the ID number data field, the title data field, and the description data field," among other possible examples.

The function of generating the prompt for the generative AI model 310 may also take other forms.

Returning again to the functionality of the second AI agent 306*b*, the second AI agent's functions of passing the generated prompt to the generative AI model 310 and receiving the response from the generative AI model 310 comprising the prediction of which data objects of the third type are related to the given data object of the fourth type may take any of various forms, which may depend in part on where the generative AI model 310 is hosted. For instance, in an implementation where the generative AI model 310 is hosted on a separate computing platform from the back-end computing platform 102, these functions may involve sending the generated prompt to the generative AI model 310 over an external network-based communication path (e.g., via an API or the like) and then receiving the response from the generative AI model 310 over the external network-based communication path. Alternatively, in an implementation where the generative AI model 310 is hosted on the back-end computing platform 102, these functions may involve sending the generated prompt via an internal communication path (e.g., an internal API, a messaging queue or bus, or some other form of inter-process communication) and then receiving the response from the generative AI model 310 over the internal communication path. The functions the second AI agent 306*b* performs to pass the generated prompt to the generative AI model 310 and to receive the response from the generative AI model 310 may take other forms as well.

In turn, the second AI agent's function of using the prediction from the generative AI model 310 as the basis for determining the final set of data objects of the third type that are related to the given data object of the fourth type may take any of various forms. For instance, as one possibility, this function may involve determining a final set of data objects that includes all of the data objects of the third type that were predicted to be related by the generative AI model 310. As another possibility, this function may involve determining a final set of data objects that includes less than all of the data objects of the third type that were predicted to be related by the generative AI model 310, such as by filtering the list of data objects returned by the generative AI model 306 based on factors such as a target number of data objects to include in the response, a threshold confidence level for the relatedness prediction, or the like. As still another possibility, this function may involve identifying additional data objects of the third type to include in the final set of data objects beyond those that are predicted to be related by the generative AI model 310, such as by identifying additional data objects of the third type that are similar to the data objects of the third type that were predicted to be related by the generative AI model 310. The function of using the prediction from the generative AI model 310 as the basis for determining the final set of data objects of the third type that are related to the given data object of the fourth type may take other forms as well.

Lastly, the second AI agent's function of passing the identification of the final set of data objects of the third type back to the AI agent supervisor 304 may involve sending the identification of the final set of data objects to the AI agent supervisor 304 via an internal communication path (e.g., an internal API, a messaging queue or bus, or some other form of inter-process communication). In this respect, the identification of the final set of data objects may take any of various forms, including but not limited to a textual description (e.g., a name), a numerical identifier, and/or link to each of the data objects in the final set.

The functionality of the second AI agent 306*b* may take various other forms as well.

Further, while not shown in FIG. 3, it should be understood that the plurality of AI agents 306 may include various other AI agents as well.

The search component 308 generally functions to (i) receive one or more search queries that seek to identify a candidate set of data objects of one type that are related to a given object of another type, (ii) perform a search in accordance with the one or more search queries, and (iii) return search results to an AI agent from which the one or more search queries were received.

In this respect, the one or more search queries that may be received by the search component 308 may take any of various forms, including but not limited to any of the forms previously described.

Further, the search component's function of performing the search in accordance with the one or more search queries may take any of various forms. For purposes of illustration, the functionality of the search component 308 will be described below with reference to the first and second types of data objects, but it should be understood that the functionality applies equally to the third and fourth types of data objects or any other pairing of two types of data objects.

As one possible implementation, the search component 308 may utilize a text-based search technique (sometimes referred to as a keyword or full-text search) to search for a candidate set of data objects of the first type that include words (e.g., in the values for the data fields defined for the first type of data object) that match a set of words included in the search query received from one of the AI agents 306 (e.g., words extracted from the values for the data fields defined for the second type of data object). One representative example of a text-based search technique may comprise a Best Match 25 (bm25) search technique, but other text-based search techniques may be utilized as well.

As another possible implementation, the search component 308 may utilize a semantic search technique that interprets the meaning of the text string to generate search results comprising a candidate set of data objects of the first type found to be related to the given data object of the second type. For instance, as one possibility, the search component 308 may utilize an embedding-based semantic search technique (or sometimes referred to as a vector search technique). In this respect, prior to performing the search, each of at least a subset of the data objects of the first type created for a construction project may be transformed into a respective set of one or more embeddings, which are then stored in one or more data stores for future use (e.g., one or more data stores included in a data storage layer of the back-end computing platform 102). In practice, these sets of embeddings could take the form of document embeddings, sentence embeddings, and/or word embeddings, among other possibilities. In turn, a set of one or more embeddings contained within a search query received from one of the AI agents 306 (e.g., the first or second AI agent) may be compared against the respective sets of one or more embeddings in the one or more data stores in order to identify a candidate set of data objects of the first type that are deemed to be related to the given data object of the second type (e.g., based on a metric that measures vector similarity, such as cosine similarity, Euclidean distance, etc.).

In line with the discussion, the function of transforming a data object into a respective set of one or more embeddings may take any of various forms, and in at least some implementations, may involve (i) pre-processing the given data object of the second type so as to place it into a form that can be input into an embedding model, such as by extracting certain data alphanumeric values from the given data object of the second type and placing them into an alphanumeric text string and/or preparing an image for input to the embedding model, and then (ii) inputting the pre-processed version of the given data object of the second type (e.g., the alphanumeric text string or the image) into the embedding model that functions to generate the set of one or more embeddings. In this respect, the embedding model that is used to transform the data objects into respective sets of one or more embeddings may comprise any one of various types of embedding models that are capable of generating embeddings, such as a pre-trained document, sentence, or word embedding model that may or may not be further trained (e.g., via fine tuning, few-shot learning, or the like), and/or a document, sentence, or word embedding model that is trained in the first instance, among other possibilities. Some representative examples of embedding models include a Doc2Vec, Sentenc2Vec, or Word2Vec type of embedding model, a GloVe type of embedding model, an ElMo type of embedding model, a fastText type of embedding model, and a BERT type of embedding model, among others. It should be understood, however, that the embedding model that is used to transform the data objects into respective sets of embeddings may take various other forms as well.

As another possibility, the search component 308 may utilize a different type of semantic search technique, examples of which may include query classification, semantic query parsing, and/or knowledge graphs, among other possibilities.

As yet another possible implementation, the search component 308 may utilize both a text-based search technique and a semantic search technique (e.g., an embedding-based semantic search technique) to search for a candidate set of data objects of the first type that are related to the given data object of the second type, which may be referred to as a "hybrid search." Optionally, in a hybrid search, search results of a text-based search and search results of a semantic search may be combined together into an aggregated set of search results. Search results in the aggregated sets may also be ranked (e.g., by relevance according to a relevance evaluation metric).

After searching for the candidate set of data objects of the first type that are deemed to be related to the given data object of the second type, the search component 308 may generate search results comprising an identification of the candidate set of data objects of the first type and then return the search results to the AI agent 306 from which the one or more search queries were received. In this respect, the identification of the candidate set of data objects of the first type may take any of various forms. For instance, as one possibility, the identification of the candidate set of data objects of the first type may comprise respective values for any of various data fields contained within data objects found in the candidate set of data objects of the first type, examples of which may include names (e.g., titles) of the candidate set of data objects of the first type, descriptions of the candidate set of data objects of the first type, start, end, and/or due dates of the candidate set of data objects of the first type (if applicable), and/or other values that are extracted from or otherwise derived based on the candidate set of data objects of the first type, among other possible examples. As another possibility, the identification of the candidate set of data objects of the first type may comprise identifiers of the candidate set of data objects of the first type, in which case the AI agent 306 may then function to utilize the identifiers to retrieve the data values of the data objects that are to be included in the prompt for the generative AI model 310. The identification of the candidate set of data objects of the first type may take other forms as well.

The search component 308 may perform other functions as well.

Turning next to the generative AI model 310, in line with the discussion above, the generative AI model 310 may generally function to (i) receive a prompt comprising a request to perform a task, (ii) perform the task, (iii) generate a response to the request that indicates the results of performing the task, and (iv) return the response to the AI agent.

For instance, as discussed above, the generative AI model 310 may receive a prompt from the AI agent supervisor 304 comprising a request to determine which of the plurality of AI agents 306 is best suited to handle an incoming request from a user, in which case the generative AI model 310 may then function to predict which of the plurality of AI agents 306 is best suited to handle the incoming request, generate a response comprising the prediction of which of the plurality of AI agents 306 is best suited to handle the incoming request, and return the response to the AI agent supervisor 304.

Further, as discussed above, the generative AI model 310 may receive a prompt from one of the AI agents 306 comprising a request to determine which data objects of one type are related to a given data object of another type, in which case the generative AI model 310 may then function to predict which data objects of the one type are related to the given data object of the other type, generate a response comprising the prediction of which data objects of the one type are related to the given data object of the other type, and return the response to the AI agent 306.

The generative AI model 310 may receive various other types of requests and perform various other tasks as well.

The generative AI model 310 may take any of various forms. For instance, the generative AI model 310 may be a transformer-based model (e.g., a language model such as a large language model (LLM) and/or a multimodal model such as a vision-language model (VML)), a diffusion model, a model based on a generational adversarial network (GAN), and/or a model based on a variational autoencoders (VAEs), among other possible types of generative AI models. Further, the generative AI model 310 may comprise a pre-trained generative AI model (e.g., an "off-the-shelf" generative AI model) that may or may not be further trained (e.g., via fine tuning, few-shot learning, or the like), or may comprise a generative AI model that is trained in the first instance to perform the tasks described herein, among other possibilities. Some representative examples of pre-trained generative AI models include a generative pre-trained transformer (GPT) type of generative AI model, a bidirectional encoder representations from transformers (BERT) type of generative AI model, a bidirectional auto-regressive transformer (BART) type of generative AI model, a text-to-text transfer transformer (T5) type of generative AI model, a pre-training with extracted gap sentences for abstractive summarization (PEGASUS) type of generative AI model, a large language model meta AI (LlaMA) type of generative AI model, a Phi-2 or Phi-3 type of generative AI model, a PaliGemma type of generative AI model, and/or a Florence-2 type of generative AI model, among other examples. The generative AI model 310 may take other forms as well.

As discussed above, in some implementations, the generative AI model 310 may be hosted on a computing platform that is separate from the back-end computing platform 102, in which case the generative AI model 310 may be accessed over a network-based communication path (e.g., via an API or the like), while in other implementations, the generative AI model 310 may be hosted on the back-end computing platform 102.

It should also be understood that the components of the example software-based pipeline 300 could interface with multiple different generative AI models 310. For instance, as one possibility, different components of the example software-based pipeline 300 could be configured to interface with multiple different generative AI models 310, which could be of the same type or of different types. As another possibility, a given component of the example software-based pipeline 300 (e.g., a given AI agent 306) could be configured to interface with multiple different generative AI models 310, which could be of the same type or of different types. Other configurations are possible as well.

The example software-based pipeline 300 may take various other forms as well. For instance, as one possibility, the example software-based pipeline 300 may include other components that are not shown or described above but may nevertheless facilitate the functionality disclosed herein. As another possibility, certain of the components shown and described above could be combined together or separated out into multiple sub-components. For example, in an implementation where the plurality of AI agents 306 are implemented in the form of configuration files that are executed by a centralized execution engine, the centralized execution engine could be combined together with the AI agent supervisor 304. As another example, the front-end interface 302 could be combined together with the AI agent supervisor 304. Other examples are possible as well. As yet another possibility, certain of the components shown and described above may perform additional or different functionality from what is described above. For example, in addition to the functionality described above, the AI agent supervisor 304 may function to decompose the incoming request into a set of subqueries that are to be handled by the identified at least one AI agent so as to facilitate the task of responding to the incoming request, and in such an implementation, the AI agent supervisor 304 (or some other component) may further function to compose a final response to the incoming request based on the sub-query responses (e.g., with the assistance of the generative AI model 310). Other variations of the example software-based pipeline 300 are possible as well.

While the foregoing example software-based pipeline 300 is described in terms of identifying related data objects of different types, it should be understood that the example software-based pipeline 300 may also include one or more other AI agents for identifying relationships between data objects of the same type. For example, duplicate RFIs are often added to a construction project when project documentation is unclear and communication between different parties that are working on the construction project is not fully coordinated. As a result, a party that poses a question in a new RFI that duplicates a previous RFI may be unduly delayed while awaiting a response to the new RFI without realizing that the question has already been answered in a response to the previous RFI. By contrast, if an AI agent for identifying relationships between RFI data objects is used (e.g., in the example software-based pipeline 300 described above), the party can be apprised of the relationship between the new RFI and the previous RFI so that such a delay can be avoided (e.g., because the party would know where to find the answer to the question as soon as a response to the previous RFI were to be provided). Other examples of finding relationships between objects of the same type are also possible.

Figure 4:
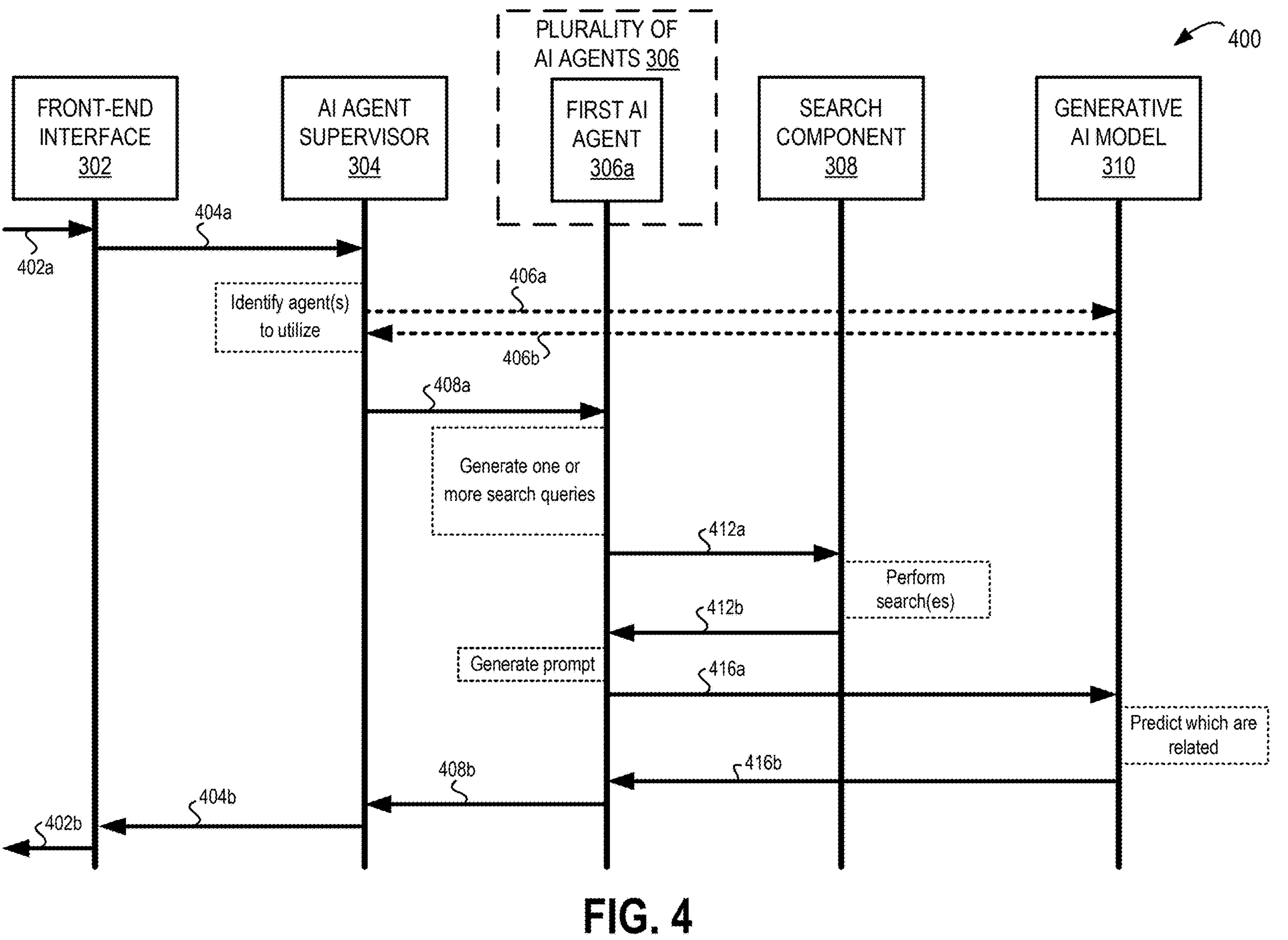
FIG. 4 shows a communication diagram that depicts communications between components shown in FIG. 3 in accordance with the functionality disclosed herein.

Turning now to FIG. 4, a communication diagram 400 that depicts communications between components shown in FIG. 3 is shown in accordance with the functionality disclosed herein. The communication diagram 400 illustrates the respective source and respective destination of each communication depicted therein. In addition, the communication diagram 400 illustrates one possible sequence of the communications shown. However, some of the communications shown may occur concurrently and/or in sequences that differ from the sequence shown. Furthermore, in some implementations, two or more of the communications shown may be combined into a single communication and/or a single communication may be divided into multiple communications. Also, in some implementations, the disclosed functionality may involve additional communications that are not depicted in the communication diagram 400.

At the arrow 402*a*, a client device running front-end software for the construction management software application (not shown) sends a request to identify relationships between data objects of different types that are supported by the construction management software application to the front-end interface 302. The request to identify relationships between data objects that is received by the front-end interface 302 may take any of the various forms discussed above, and for purposes of this example, will be assumed to be a request to identify data objects of the first type that are related to a given data object of the second type.

At the arrow 404*a*, the front-end interface 302 passes the received request to the AI agent supervisor 304. After receiving the incoming request to identify relationships between data objects within the construction management software application, the AI agent supervisor 304 identifies the first AI agent 306*a* as the AI agent that is to be utilized to handle the incoming request.

The function of identifying the AI agent that is to be utilized to handle the incoming request may take any of the various forms discussed above. In the communication diagram 400, the form that is depicted involves using the generative AI model 310 to determine which of the plurality of AI agents 306 is best suited to handle the incoming request. In this respect, at the arrow 406*a*, the AI agent supervisor 304 generates a prompt comprising a request to determine which of the plurality of AI agents 306 is best suited to handle the incoming request and passes the prompt as input to the generative AI model 310. In turn, at the arrow 406*b*, the generative AI model 310 sends a response comprising a prediction that the first AI agent 306*a* is best suited to handle the incoming request. The AI agent supervisor 304 uses that prediction as a basis for identifying the first AI agent 306*a* as the AI agent that is to be utilized to handle the incoming request. Specifically, the AI agent supervisor 304 may determine that the first AI agent 306*a* is to be utilized to handle the incoming request to identify data objects of the first type that are related to the given data object of the second type.

At the arrow 408*a*, the AI agent supervisor 304 routes the incoming request to the first AI agent 306*a* by sending the first AI agent 306*a* the request to identify data objects of the first type that are related to the given data object of the second type. After receiving the request, the first AI agent 306*a* may generate one or more search queries that seek to identify a candidate set of data objects of the first type that are related to the given data object of the second type. The function of generating the one or more search queries may take any of the forms discussed above.

At the arrow 412*a*, the first AI agent 306*a* provides the one or more search queries to the search component 308. After receiving the one or more search queries, the search component 308 performs a search in accordance with the one or more search queries. The function of performing the search may take any of the forms discussed above.

At the arrow 412*b*, the search component 308 returns a set of search results for the search to the first AI agent 306*a*. The set of search results comprises the set of candidate data objects of the first type. After receiving the search results, the first AI agent 306*a* generates a prompt for the generative AI model 310 that comprises a request to determine which of the candidate set of data objects of the first type are related to the given data object of the second type. The function of generating the prompt may take any of the various forms discussed above.

At the arrow 416*a*, the first AI agent 306*a* passes the prompt to the generative AI model 310 as input. After receiving the prompt, the generative AI model 310 may generate a response that comprises a prediction of which data objects of the first type (e.g., from among the set of candidate data objects of the first type) are related to the given data object of the second type.

At the arrow 416*b*, the generative AI model 310 returns the response to the first AI agent 306*a*. After receiving the response from the generative AI model 310, the first AI agent 306*a* uses the prediction as a basis for determining a final set of data objects of the first type that are related to the given data object of the second type.

At the arrow 408*b*, the first AI agent 306*a* passes a response comprising an identification of the final set of data objects of the first type that are related to the given data object of the second type back to the AI agent supervisor 304.

At the arrow 404*b*, after receiving the response comprising the final set, the AI agent supervisor 304 passes the response that comprises the identification of the final set of data objects back to the front-end interface 302.

At the arrow 402*b*, the front-end interface 302 sends the identification of the final set of data objects to the client device (not shown) along with an instruction to present the identification of the final set of data objects to the user.

Figure 5:
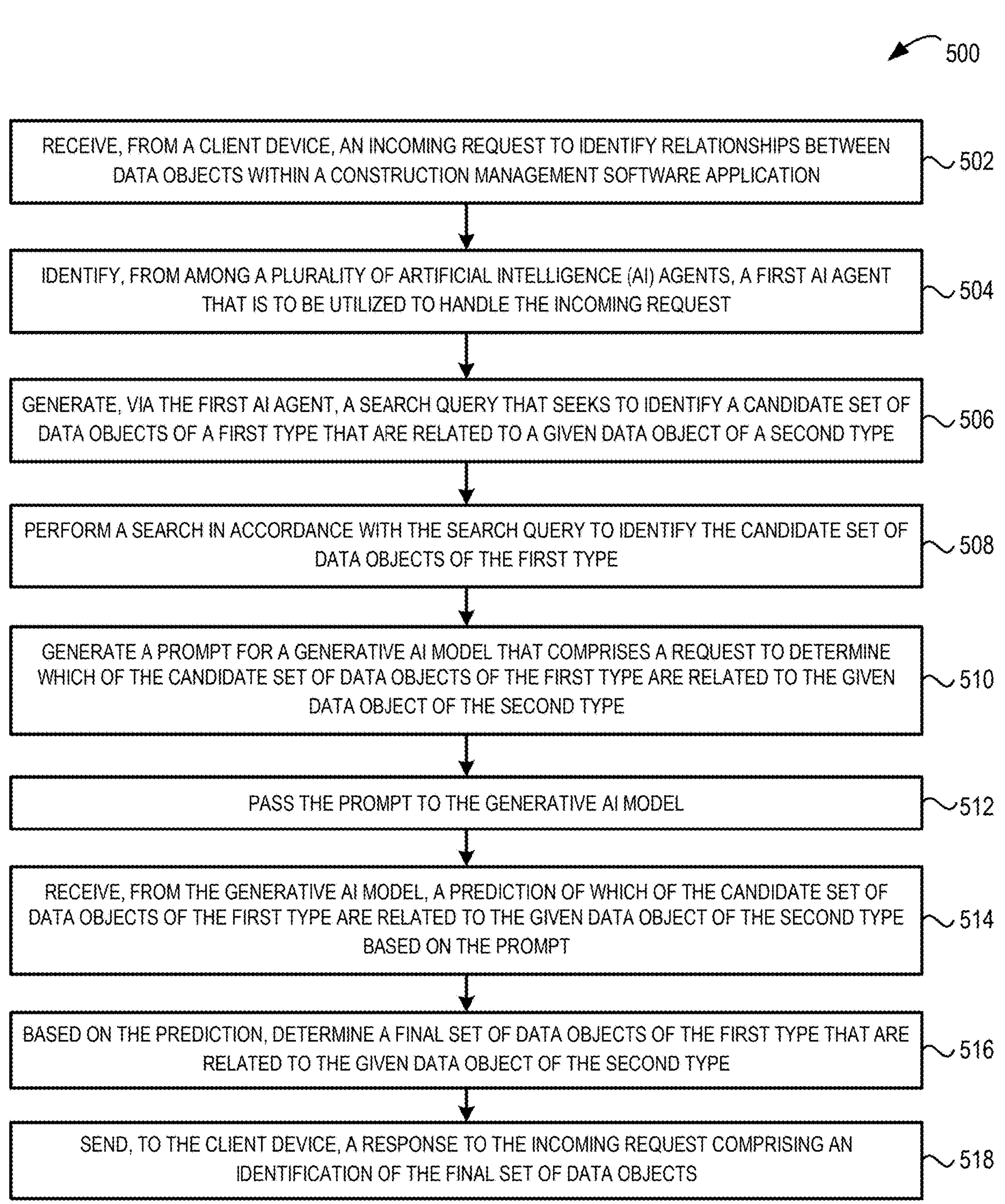
FIG. 5 illustrates one possible implementation of functionality that may be carried out by the example software-based pipeline of FIG. 3.

Turning next to FIG. 5, a flow diagram is shown to illustrate one possible implementation of the functionality that may be carried out by the example software-based pipeline 300 of FIG. 3. For purposes of illustration, the example functionality 500 of FIG. 5 is described as being carried out by the back-end computing platform 102 of FIG. 1, but it should be understood that the example functionality 500 of FIG. 5 may be carried out by any computing platform that is capable of running the software disclosed herein. Further, it should be understood that the example functionality of FIG. 5 is merely described in this manner for the sake of clarity and explanation and that the example functionality may be implemented in various other manners, including the possibility that functions may be added, removed, rearranged into different orders, combined into fewer blocks, and/or separated into additional blocks depending upon the particular example.

As shown in FIG. 5, the example functionality 500 may begin at block 502 with the back-end computing platform 102 receiving, from a client device, an incoming request to identify relationships between data objects within a construction management software application.

At block 504, the back-end computing platform 102 identifies, from among a plurality of artificial intelligence (AI) agents, a first AI agent that is to be utilized to handle the incoming request.

The first type of data object and/or the second type of data object may take any of various forms. For instance, as one possibility, the first type of data object is a schedule-item type and the second type of data object is a submittal type. As another possibility, the first type of data object is a schedule-item type and the second type of data object is a photo type. The first type of data object and/or the second type of data object may also take other forms.

The approach that the back-end computing platform 102 uses to identify the first AI agent to be utilized to handle the incoming request may take any of various forms. For instance, as one possibility, the back-end computing platform 102 may (i) generate a second prompt for the generative AI model comprising a request to determine which of the plurality of AI agents is best suited to handle the incoming request, (ii) pass the second prompt to the generative AI model; (iii) receive, from the generative AI model, a prediction of which of the plurality of AI agents is best suited to handle the incoming request; and (iv) use the prediction of which of the plurality of AI agents is best suited to handle the incoming request as a basis for identifying the first AI agent that is to be utilized to handle the incoming request.

As another possibility, the back-end computing platform 102 may (i) generate a set of feature data based on the incoming request; (ii) pass the set of feature data as input to a rule-based model; (iii) receive, from the rule-based model, a prediction of which one of the plurality of AI agents is best suited to handle the incoming request, and (iv) use the prediction of which of the plurality of AI agents is best suited to handle the incoming request as a basis for identifying the first AI agent that is to be utilized to handle the incoming request.

The approach the back-end computing platform 102 uses to identify the first AI agent may also take other forms.

At block 506, the back-end computing platform 102 generates, via the first AI agent, a search query that seeks to identify a candidate set of data objects of a first type that are related to a given data object of a second type.

The approach that the back-end computing platform 102 uses via the first AI agent to generate the search query may take any of various forms. For instance, as one possibility, the back-end computing platform 102 may (i) identify, for each of one or more data fields defined for data objects of the second type, a respective value for the given data object of the second type; and (ii) include the respective values for the one or more data fields in the search query.

As another possibility, the back-end computing platform 102 may (i) transform the given data object of the second type into a set of one or more embeddings; and (ii) generate a search query that contains the set of one or more embeddings.

The approach that the back-end computing platform 102 uses via the first AI agent to generate the search query may also take other forms.

At block 508, the back-end computing platform 102 performs a search in accordance with the search query to identify the candidate set of data objects of the first type.

The approach that the back-end computing platform 102 uses to perform the search may take any of various forms. For instance, as one possibility, the back-end computing platform 102 may utilize a text-based search technique to search for a candidate set of data objects of the first type that include words (e.g., in the values for data fields defined for the first type of data object) that match a set of words included in the search query (e.g., words extracted from the values for data fields defined for the second type of data object).

As another possibility, the back-end computing platform 102 may utilize a semantic search technique that interprets the meaning of a text string comprising alphanumeric values extracted from the given data object to generate search results comprising a candidate set of data objects of the first type found to be related to the given data object of the second type.

As yet another possibility, the back-end computing platform 102 may utilize both a text-based search technique and a semantic search technique to search for a candidate set of data objects of the first type that are related to the given data object of the second type.

The approach that the back-end computing platform 102 uses to perform the search may also take other forms.

At block 510, the back-end computing platform 102 generates a prompt for a generative AI model that comprises a request to determine which of the candidate set of data objects of the first type are related to the given data object of the second type.

The prompt may take any of various forms. For instance, as one possibility, the prompt may comprise an identification of the given data object of the second type and an identification of the candidate set of data objects of the first type. The prompt may also take other forms.

At block 512, the back-end computing platform 102 passes the prompt to the generative AI model.

At block 514, the back-end computing platform 102 receives, from the generative AI model, a prediction of which of the candidate set of data objects of the first type are related to the given data object of the second type based on the prompt.

At block 516, the back-end computing platform 102 determines, based on the prediction, a final set of data objects of the first type that are related to the given data object of the second type.

At block 518, the back-end computing platform 102 sends, to the client device, a response to the incoming request comprising an identification of the final set of data objects.

Figure 6:
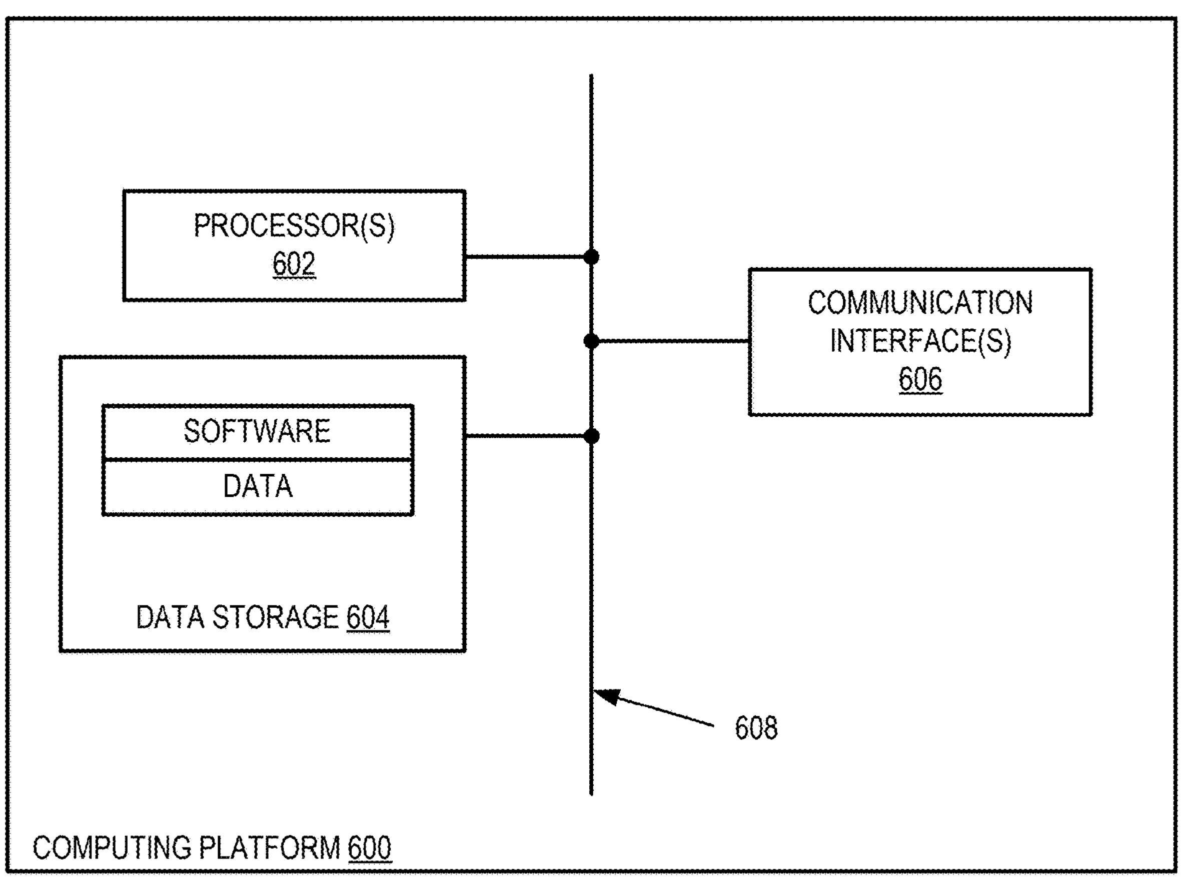
FIG. 6 illustrates a simplified block diagram is provided to illustrate some structural components that may be included in an example computing platform that may be configured to perform the platform-side functions disclosed herein.

Turning now to FIG. 6, a simplified block diagram is provided to illustrate some structural components that may be included in an example computing platform 600 that may be configured to perform the platform-side functions disclosed herein. At a high level, the example computing platform 600 may generally comprise any one or more computer systems (e.g., one or more servers) that collectively include one or more processors 602, data storage 604, and one or more communication interfaces 606, each of which may be communicatively linked by a communication link 608 that may take the form of a system bus, a communication network such as a public, private, or hybrid cloud, or some other connection mechanism. Each of these components may take various forms.

For instance, the one or more processors 602 may comprise one or more processor components, such as one or more central processing units (CPUs), graphics processing units (GPUs), application-specific integrated circuits (ASICs), digital signal processor (DSPs), and/or programmable logic devices such as field programmable gate arrays (FPGAs), among other possible types of processing components. In line with the discussion above, it should also be understood that the one or more processors 602 could comprise processing components that are distributed across a plurality of physical computing devices connected via a network, such as a computing cluster of a public, private, or hybrid cloud.

In turn, the data storage 604 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that the data storage 604 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 6, the data storage 604 may be capable of storing both (i) program instructions that are executable by the one or more processors 602 such that the example computing platform 600 is configured to perform any of the various functions disclosed herein (including but not limited to any of the platform-side functions discussed above), and (ii) data that may be received, derived, or otherwise stored by the example computing platform 600.

The one or more communication interfaces 606 may comprise one or more interfaces that facilitate communication between the example computing platform 600 and other systems or devices, where each such interface may be wired and/or wireless and may communicate according to any of various communication protocols. As examples, the one or more communication interfaces 606 may take include an Ethernet interface, a serial bus interface (e.g., Firewire, USB 3.0, etc.), a chipset and antenna adapted to facilitate any of various types of wireless communication (e.g., Wi-Fi communication, cellular communication, Bluetooth® communication, etc.), and/or any other interface that provides for wireless or wired communication. Other configurations are possible as well.

Although not shown, the example computing platform 600 may additionally have an Input/Output (I/O) interface that includes or provides connectivity to I/O components that facilitate user interaction with the example computing platform 600, such as a keyboard, a mouse, a trackpad, a display screen, a touch-sensitive interface, a stylus, a virtual-reality headset, and/or one or more speaker components, among other possibilities.

It should be understood that the example computing platform 600 is one example of a computing platform that may be used with the examples described herein. Numerous other arrangements are possible and contemplated herein. For instance, in other examples, the example computing platform 600 may include additional components not pictured and/or more or less of the pictured components.

Figure 7:
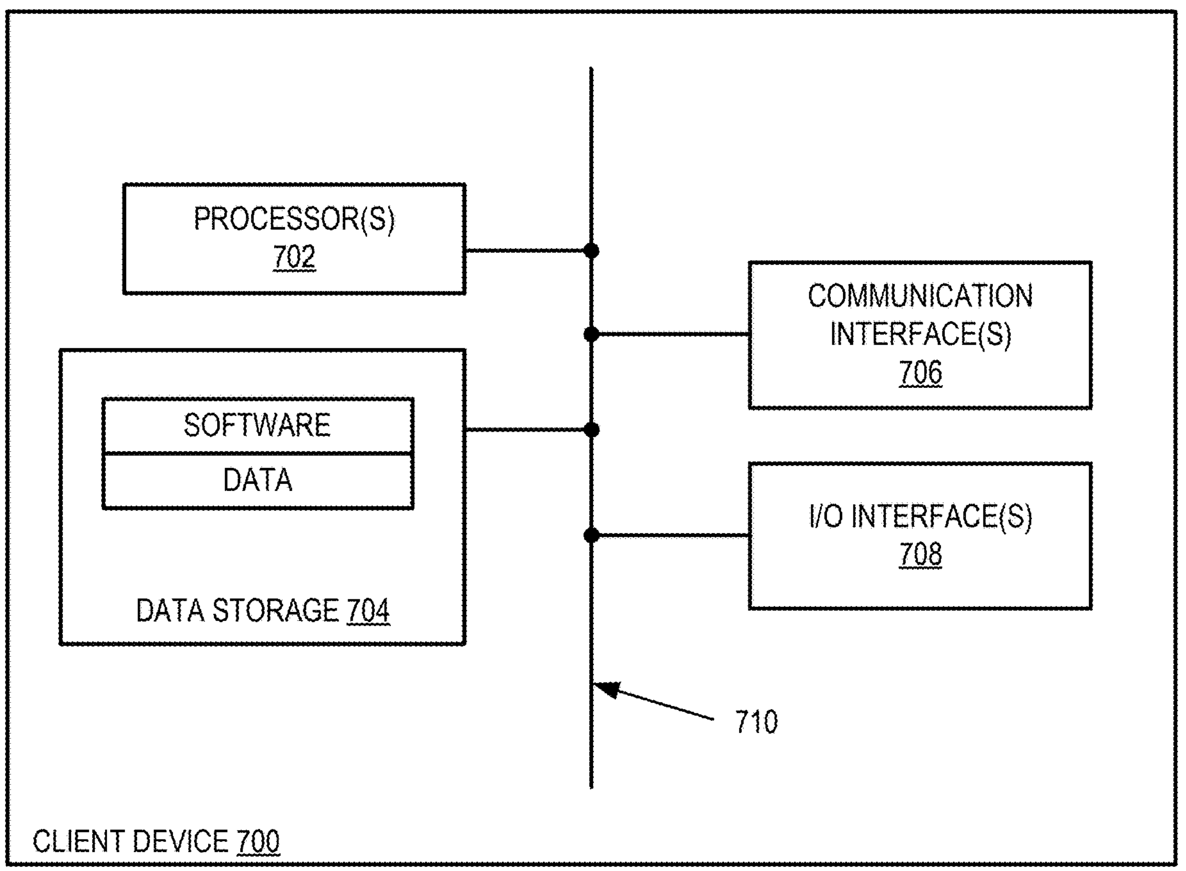
FIG. 7 illustrates a simplified block diagram is provided to illustrate some structural components that may be included in an example client device that may be configured to perform some of the client-side functions disclosed herein.

Turning next to FIG. 7, a simplified block diagram is provided to illustrate some structural components that may be included in an example client device 700 that may be configured to perform some of the client-side functions disclosed herein. At a high level, the example client device 700 may include one or more processors 702, data storage 704, one or more communication interfaces 706, and an I/O interface 708, each of which may be communicatively linked by a communication link 710 that may take the form a system bus and/or some other connection mechanism. Each of these components may take various forms.

For instance, the one or more processors 702 of the example client device 700 may comprise one or more processor components, such as one or more CPUs, GPUs, ASICs, DSPs, and/or programmable logic devices such as FPGAs, among other possible types of processing components.

In turn, the data storage 704 of the example client device 700 may comprise one or more non-transitory computer-readable mediums, examples of which may include volatile storage mediums such as random-access memory, registers, cache, etc. and non-volatile storage mediums such as read-only memory, a hard-disk drive, a solid-state drive, flash memory, an optical-storage device, etc. As shown in FIG. 7, the data storage 704 may be capable of storing both (i) program instructions that are executable by the one or more processors 702 of the example client device 700 such that the example client device 700 is configured to perform any of the various functions disclosed herein (including but not limited to any of the client-side functions discussed above), and (ii) data that may be received, derived, or otherwise stored by the example client device 700.

The one or more communication interfaces 706 may comprise one or more interfaces that facilitate communication between the example client device 700 and other systems or devices, where each such interface may be wired and/or wireless and may communicate according to any of various communication protocols. As examples, the one or more communication interfaces 706 may take include an Ethernet interface, a serial bus interface (e.g., Firewire, USB 3.0, etc.), a chipset and antenna adapted to facilitate any of various types of wireless communication (e.g., Wi-Fi communication, cellular communication, Bluetooth® communication, etc.), and/or any other interface that provides for wireless or wired communication. Other configurations are possible as well.

The I/O interface 708 may generally take the form of (i) one or more input interfaces that are configured to receive and/or capture information at the example client device 700 and (ii) one or more output interfaces that are configured to output information from the example client device 700 (e.g., for presentation to a user). In this respect, the one or more input interfaces of I/O interface may include or provide connectivity to input components such as a microphone, a camera, a keyboard, a mouse, a trackpad, a touchscreen, and/or a stylus, among other possibilities, and the one or more output interfaces of the I/O interface 708 may include or provide connectivity to output components such as a display screen and/or an audio speaker, among other possibilities.

It should be understood that the example client device 700 is one example of a client device that may be used with the examples described herein. Numerous other arrangements are possible and contemplated herein. For instance, in other examples, the example client device 700 may include additional components not pictured and/or more or fewer of the pictured components.

Examples of the disclosed innovations have been described above. Those skilled in the art will understand, however, that changes and modifications may be made to the examples described without departing from the true scope and spirit of the present invention, which will be defined by the claims.

Further, to the extent that examples described herein involve operations performed or initiated by actors, such as "humans," "operators," "users," or other entities, this is for purposes of example and explanation only. The claims should not be construed as requiring action by such actors unless explicitly recited in the claim language.

What is claimed is:

1. A computing platform comprising:

at least one processor;

at least one non-transitory computer-readable medium; and program instructions stored on the at least one non-transitory computer-readable medium that, when executed by the at least one processor, cause the computing platform to:

receive, from a client device, an incoming request to identify relationships between data objects of a first type and a given data object of a second type within a construction management software application;

identify, from among a plurality of artificial intelligence (AI) agents that are preconfigured to perform different tasks within the construction management software application, a first AI agent that is specifically preconfigured to identify relationships between data objects of the first type and data objects of the second type within the construction management software application;

provide the incoming request to the first AI agent and thereby cause the first AI agent to:

generate a search query that seeks to identify a candidate set of data objects of the first type within the construction management software application that are potentially related to the given data object of the second type, wherein the search query comprises a representation of data content included within the given data object of the second type that is to be utilized as a basis for identifying the candidate set of data objects of the first type;

cause a search to be performed in accordance with the search query to obtain a respective identification of each data object in the candidate set of data objects of the first type, wherein the search involves evaluating representations of data content included within available data objects of the first type against the representation of the data content included within the given data object of the second type;

generate a prompt for a generative AI model that comprises (i) the respective identification of each data object in the candidate set of data objects of the first type, (ii) a given identification of the given data object of the second type, and (iii) a request to determine which of the candidate set of data objects of the first type are related to the given data object of the second type;

pass the prompt to the generative AI model;

receive, from the generative AI model, a prediction of which of the candidate set of data objects of the first type are related to the given data object of the second type based on the prompt; and based on the prediction, determine a final set of data objects of the first type that are related to the given data object of the second type; and send, to the client device, a response to the incoming request comprising an identification of the final set of data objects.

2. The computing platform of claim 1, wherein the program instructions that, when executed by the at least one processor, cause the computing platform to identify, from among the plurality of AI agents that are preconfigured to perform different tasks within the construction management software application, the first AI agent that is specifically preconfigured to identify relationships between data objects of the first type and data objects of the second type within the construction management software application comprise instructions that, when executed by the at least one processor, cause the computing platform to:

generate a second prompt for the generative AI model comprising a request to determine which of the plurality of AI agents is best suited to handle the incoming request;

pass the second prompt to the generative AI model;

receive, from the generative AI model, a prediction of which of the plurality of AI agents is best suited to handle the incoming request, wherein the prediction identifies the first AI agent based on it being specifically preconfigured to identify relationships between data objects of the first type and data objects of the second type within the construction management software application; and use the prediction of which of the plurality of AI agents is best suited to handle the incoming request as a basis for identifying the first AI agent.

3. The computing platform of claim 1, wherein the program instructions that, when executed by the at least one processor, cause the computing platform to identify, from among the plurality of AI agents that are preconfigured to perform different tasks within the construction management software application, the first AI agent that is specifically preconfigured to identify relationships between data objects of the first type and data objects of the second type within the construction management software application comprise instructions that, when executed by the at least one processor, cause the computing platform to:

generate a set of feature data based on the incoming request;

pass the set of feature data as input to a rule-based model;

receive, from the rule-based model, a prediction of which of the plurality of AI agents is best suited to handle the incoming request, wherein the prediction identifies the first AI agent based on it being specifically preconfigured to identify relationships between data objects of the first type and data objects of the second type within the construction management software application; and use the prediction of which of the plurality of AI agents is best suited to handle the incoming request as a basis for identifying the first AI agent.

4. The computing platform of claim 1, wherein generating the search query that seeks to identify the candidate set of data objects of the first type within the construction management software application that are potentially related to the given data object of the second type comprises:

identifying, for each of one or more data fields defined for data objects of the second type, a respective value for the given data object of the second type; and including the respective values for the one or more data fields in the search query.

5. The computing platform of claim 1, wherein generating the search query that seeks to identify the candidate set of data objects of the first type within the construction management software application that are potentially related to the given data object of the second type comprises:

transforming the data content of the given data object of the second type into a set of one or more embeddings; and generating a search query that contains the set of one or more embeddings.

6. The computing platform of claim 1, wherein (a) the given identification of the given data object of the second type comprises one or more respective values for one or more data fields contained within the given data object of the second type and (b) the respective identification of each respective data object in the candidate set of data objects of the first type comprises one or more respective values for one or more data fields contained within the respective data object.

7. The computing platform of claim 1, wherein the first type of data object is a schedule-item type and the second type of data object is a submittal type.

8. The computing platform of claim 1, wherein the second type of data object is a photo type.

9. The computing platform of claim 1, wherein the representation of the data content included within the given data object of the second type comprises either (A) data extracted from one or more data fields of the data content included within the given data object, or (B) one or more embeddings generated from the data content included within the given data object.

10. A non-transitory computer-readable medium, wherein the non-transitory computer-readable medium is provisioned with program instructions that, when executed by at least one processor, cause a computing platform to:

receive, from a client device, an incoming request to identify relationships between data objects of a first type and a given data object of a second type within a construction management software application;

identify, from among a plurality of artificial intelligence (AI) agents that are preconfigured to perform different tasks within the construction management software application, a first AI agent that is specifically preconfigured to identify relationships between data objects of the first type and data objects of the second type within the construction management software application;

provide the incoming request to the first AI agent and thereby cause the first AI agent to:

generate a search query that seeks to identify a candidate set of data objects of the first type within the construction management software application that are potentially related to the given data object of the second type, wherein the search query comprises a representation of data content included within the given data object of the second type that is to be utilized as a basis for identifying the candidate set of data objects of the first type;

cause a search to be performed in accordance with the search query to obtain a respective identification of each data object in the candidate set of data objects of the first type, wherein the search involves evaluating representations of data content included within available data objects of the first type against the representation of the data content included within the given data object of the second type;

generate a prompt for a generative AI model that comprises (i) the respective identification of each data object in the candidate set of data objects of the first type, (ii) a given identification of the given data object of the second type, and (iii) a request to determine which of the candidate set of data objects of the first type are related to the given data object of the second type;

pass the prompt to the generative AI model;

receive, from the generative AI model, a prediction of which of the candidate set of data objects of the first type are related to the given data object of the second type based on the prompt; and based on the prediction, determine a final set of data objects of the first type that are related to the given data object of the second type; and send, to the client device, a response to the incoming request comprising an identification of the final set of data objects.

11. The non-transitory computer-readable medium of claim 10, wherein the program instructions that, when executed by the at least one processor, cause the computing platform to identify, from among the plurality of AI agents that are preconfigured to perform different tasks within the construction management software application, the first AI agent that is specifically preconfigured to identify relationships between data objects of the first type and data objects of the second type within the construction management software application comprise instructions that, when executed by the at least one processor, cause the computing platform to:

generate a second prompt for the generative AI model comprising a request to determine which of the plurality of AI agents is best suited to handle the incoming request;

pass the second prompt to the generative AI model;

receive, from the generative AI model, a prediction of which of the plurality of AI agents is best suited to handle the incoming request, wherein the prediction identifies the first AI agent based on it being specifically preconfigured to identify relationships between data objects of the first type and data objects of the second type within the construction management software application; and use the prediction of which of the plurality of AI agents is best suited to handle the incoming request as a basis for identifying the first AI agent.

12. The non-transitory computer-readable medium of claim 10, wherein the program instructions that, when executed by the at least one processor, cause the computing platform to identify, from among the plurality of AI agents that are preconfigured to perform different tasks within the construction management software application, the first AI agent that is specifically preconfigured to identify relationships between data objects of the first type and data objects of the second type within the construction management software application comprise instructions that, when executed by the at least one processor, cause the computing platform to:

generate a set of feature data based on the incoming request;

pass the set of feature data as input to a rule-based model;

receive, from the rule-based model, a prediction of which of the plurality of AI agents is best suited to handle the incoming request, wherein the prediction identifies the first AI agent based on it being specifically preconfigured to identify relationships between data objects of the first type and data objects of the second type within the construction management software application; and use the prediction of which of the plurality of AI agents is best suited to handle the incoming request as a basis for identifying the first AI agent.

13. The non-transitory computer-readable medium of claim 10, wherein generating the search query that seeks to identify the candidate set of data objects of the first type within the construction management software application that are potentially related to the given data object of the second type comprises:

identifying, for each of one or more data fields defined for data objects of the second type, a respective value for the given data object of the second type; and including the respective values for the one or more data fields in the search query.

14. The non-transitory computer-readable medium of claim 10, wherein generating the search query that seeks to identify the candidate set of data objects of the first type within the construction management software application that are potentially related to the given data object of the second type comprises:

transforming the data content of the given data object of the second type into a set of one or more embeddings; and generating a search query that contains the set of one or more embeddings.

15. The non-transitory computer-readable medium of claim 10, wherein (a) the given identification of the given data object of the second type comprises one or more respective values for one or more data fields contained within the given data object of the second type and (b) the respective identification of each respective data object in the candidate set of data objects of the first type comprises one or more respective values for one or more data fields contained within the respective data object.

16. The non-transitory computer-readable medium of claim 10, wherein the first type of data object is a schedule-item type and the second type of data object is a submittal type.

17. The non-transitory computer-readable medium of claim 10, wherein the second type of data object is a photo type.

18. The non-transitory computer-readable medium of claim 10, wherein the representation of the data content included within the given data object of the second type comprises either (A) data extracted from one or more data fields of the data content included within the given data object, or (B) one or more embeddings generated from the data content included within the given data object.

19. A method comprising:

receiving, from a client device, an incoming request to identify relationships between data objects of a first type and a given data object of a second type within a construction management software application;

identifying, from among a plurality of artificial intelligence (AI) agents that are preconfigured to perform different tasks within the construction management software application, a first AI agent that is specifically preconfigured to identify relationships between data objects of the first type and data objects of the second type within the construction management software application;

providing the incoming request to the first AI agent and thereby causing the first AI agent to perform functions comprising:

generating a search query that seeks to identify a candidate set of data objects of the first type within the construction management software application that are related to the given data object of the second type, wherein the search query comprises a representation of data content included within the given data object of the second type that is to be utilized as a basis for identifying the candidate set of data objects of the first type;

causing a search to be performed in accordance with the search query to obtain a respective identification of each data object in the candidate set of data objects of the first type, wherein the search involves evaluating representations of data content included within available data objects of the first type against the representation of the data content included within the given data object of the second type;

generating a prompt for a generative AI model that comprises (i) the respective identification of each data object in the candidate set of data objects of the first type, (ii) a given identification of the given data object of the second type, and (iii) a request to determine which of the candidate set of data objects of the first type are related to the given data object of the second type;

passing the prompt to the generative AI model;

receiving, from the generative AI model, a prediction of which of the candidate set of data objects of the first type are related to the given data object of the second type based on the prompt; and based on the prediction, determining a final set of data objects of the first type that are related to the given data object of the second type; and sending, to the client device, a response to the incoming request comprising an identification of the final set of data objects.

20. The method of claim 19, wherein identifying, from among the plurality of AI agents that are preconfigured to perform different tasks within the construction management software application, the first AI agent that is specifically preconfigured to identify relationships between data objects of the first type and data objects of the second type within the construction management software application comprises:

generating a second prompt for the generative AI model comprising a request to determine which of the plurality of AI agents is best suited to handle the incoming request;

passing the second prompt to the generative AI model;

receiving, from the generative AI model, a prediction of which of the plurality of AI agents is best suited to handle the incoming request, wherein the prediction identifies the first AI agent based on it being specifically preconfigured to identify relationships between data objects of the first type and data objects of the second type within the construction management software application; and using the prediction of which of the plurality of AI agents is best suited to handle the incoming request as a basis for identifying the first AI agent.

* * * * *